US006962527B2

(12) United States Patent
Baba

(10) Patent No.: US 6,962,527 B2
(45) Date of Patent: Nov. 8, 2005

(54) RECORDING MEDIUM STORING GAME PROCESS CONTROL PROGRAM, GAME PROCESS CONTROL PROGRAM, GAME PROCESS CONTROL METHOD, AND VIDEO GAME DEVICE

(75) Inventor: Kenji Baba, Toyono-cho (JP)

(73) Assignee: Konami Computer Entertainment, Osaka (JP)

( * ) Notice: Subject to any disclaimer, the term of this patent is extended or adjusted under 35 U.S.C. 154(b) by 250 days.

(21) Appl. No.: 10/263,428

(22) Filed: Oct. 2, 2002

(65) Prior Publication Data

US 2003/0109295 A1 Jun. 12, 2003

(30) Foreign Application Priority Data

Oct. 11, 2001 (JP) ........................................ 2001-313878

(51) Int. Cl.[7] .............................................. A63F 13/00
(52) U.S. Cl. ...................... 463/4; 463/1; 463/7; 463/23
(58) Field of Search .............................. 463/1, 2, 3, 4, 463/7, 8, 23, 36, 37, 38, 6, 43–45; 273/108, 108.1, 108.2, 317.1, 317.2, 317.3, 317.4, 317.5, 317.6, 459–461; 345/683, 636; 340/691.3; 116/222–225; 473/131, 151, 409

(56) References Cited

U.S. PATENT DOCUMENTS

| 5,317,505 A | * | 5/1994 | Karabed et al. ............... 463/37 |
| 5,649,861 A | * | 7/1997 | Okano et al. .................. 463/30 |
| 5,947,819 A | * | 9/1999 | Ohshima ........................ 463/2 |
| 6,066,046 A | * | 5/2000 | Yamamoto ..................... 463/7 |
| 6,117,014 A | * | 9/2000 | Aoyama et al. ............... 463/43 |
| 6,149,523 A | * | 11/2000 | Yamada et al. ............... 463/31 |
| 6,184,899 B1 | * | 2/2001 | Akemann ................... 345/473 |
| 6,280,323 B1 | * | 8/2001 | Yamazaki et al. ............. 463/4 |
| 6,322,448 B1 | * | 11/2001 | Kaku et al. .................... 463/32 |
| 6,354,940 B1 | * | 3/2002 | Itou et al. ........................ 463/8 |
| 6,394,897 B1 | * | 5/2002 | Togami ........................... 463/4 |
| 6,604,008 B2 | * | 8/2003 | Chudley et al. ............. 700/92 |
| 6,679,776 B1 | * | 1/2004 | Nishiumi et al. ............. 463/36 |

(Continued)

FOREIGN PATENT DOCUMENTS

| EP | 0 830 881 | 3/1998 |
| EP | 0 917 897 | 5/1999 |

(Continued)

OTHER PUBLICATIONS

Instructions: California Games, circa 1991, http://skyscraper.fortunecity.com/dos/209/lynxwld/manuals/california_games.htm., 8pp.*

(Continued)

Primary Examiner—Jessica Harrison
Assistant Examiner—Jason Skaarup
(74) Attorney, Agent, or Firm—Jordan And Hamburg LLP

(57) ABSTRACT

A game progress control program, game progress control method, and video game device, which reflect the player strategy in the video game and have excellent game properties, are provided. A procedure storage unit 51 stores a plurality of operation procedures of a controller 19; an operation reception unit 401 receives operations from the controller 19 performed within a prescribed time interval; an operation decision unit 402 selects one operation procedure from among operation procedures stored in the procedure storage unit 51 as an operation procedure equivalent to operations from the controller 19; a time calculation unit 404 calculates the holding time over which the final operation performed in the operation procedure selected by the operation decision unit 402 is held; and a point-awarding unit 406 awards points based on the decision result of the operation decision unit 402 and the holding time.

13 Claims, 17 Drawing Sheets

U.S. PATENT DOCUMENTS

| | | | |
|---|---|---|---|
| 6,699,127 B1 * | 3/2004 | Lobb et al. | 463/43 |
| 6,702,677 B1 * | 3/2004 | Fujisawa et al. | 463/43 |
| 6,746,331 B1 * | 6/2004 | Saikawa et al. | 463/31 |
| 2001/0008397 A1 * | 7/2001 | Komata | 345/156 |
| 2001/0008844 A1 | 7/2001 | Yamauchi et al. | |

FOREIGN PATENT DOCUMENTS

| | | |
|---|---|---|
| JP | 9-024161 | 1/1997 |
| JP | 10-137443 | 5/1998 |
| JP | 11-156054 | 6/1999 |
| JP | 2000-024314 | 1/2000 |
| JP | 2001-009150 | 1/2001 |
| JP | 2001-224859 | 8/2001 |
| JP | 2001-259220 | 9/2001 |
| WO | 97/32642 | 9/1997 |

OTHER PUBLICATIONS

Jung, Robert: California Games: The classic Epyx computer game arrive on Lynx. The full review. Jul. 6, 1999, http://gameboy.ign.com/articles/155/155859p1.html., 3pp□□.*

"The Adrenaline Vault Review of SSX," web article. EA Sports, publisher, M. Laidlaw, reviewer. Published Dec. 1, 2000. Available http://www.avault.com/consoles/reviews/ps2/print_review.asp?game=ssx. Printed May 14, 2001, 5 pp. □□.*

SSX Playstation2 Game Review in Absolute Playstation2 (PS2)—SSX web article. EA Sports, Developer. Available http://www.absolute–playstation.com/ssx/ssx_review.htm. Printed May 14, 2001, 6 pp.*

Perry, Douglass C.: Jonny Moseley Mad Trix: The first radical skiing game is in development and 3DO is at the helm. Nov. 29, 2001. http://ps2.ign.com/articles/136/136648p1.html., 5pp.*

"Hyper Olympic Games in Nagano Official Guide" p. 96–99, published on Dec. 18, 1997 by Konami Corporation.

Nagano Winter Olympics '98 Manual, downloaded from Internet on Oct. 4, 2002 <http://www.cheatcc.com/psx/–manuals/–nagano.txt>pp. 1–10.

Nagano Winter Olympics '98, downloaded from Internet on Oct. 4, 2002 <http://www.n64cc.com–/reviews/revnag.htm>pp. 1–4.

Nagano Winter Olympics '98, downloaded from Internet on Oct. 4, 2002 <http://www.ign64.ign.com/–articles/152/152259pl.html> pp. 1–5.

Links 386 CD Players Manual, Access Software, Inc., 1995, pp. 23, 33, 42, 75.

Perry, Douglas C.; Jonny Moseley Mad Trix: The first radical Skiing game is in development and 3DO is at the helm, Nov. 29, 2001. http://ps2.ign.com/articles/136/136648pl.html., 5pp.

Instructions: California Games, circa 1991, http://skyscraper.fortunecity.com/dos/209/lynxwld/manuals/california_games.htm., 8pp.

Jung, Robert: California Games: The classic Epyx computer game arrive on Lynx. The full review. Jul. 6, 1999, http://gameboy.ign.com/articles/155/155859pl.html., 3pp.

"The Adrenaline Vault Review of SSX, " web article. EA Sports, publisher. M, Laidlaw, reviewer. Published Dec. 1, 2000. Available http://www.avault.com/consoles/reviews/ps2/print_review.asp?game=ssx. Printed May 14, 2001, 5pp.

SSX Playstation 2 Game Review in Absolute Playsation 2 (PS2)—SSX web article. EA Sports, Developer. Available http://www.absolute–playstation.com/ssx/ssx_review.htm. Printed May 14, 2001, 6pp.

* cited by examiner

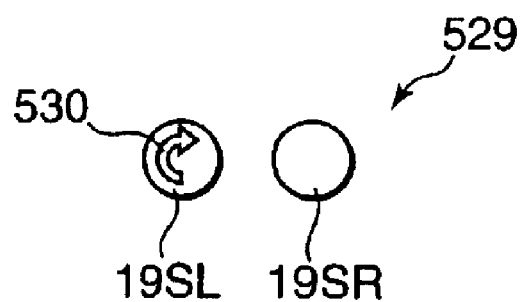

FIG.13
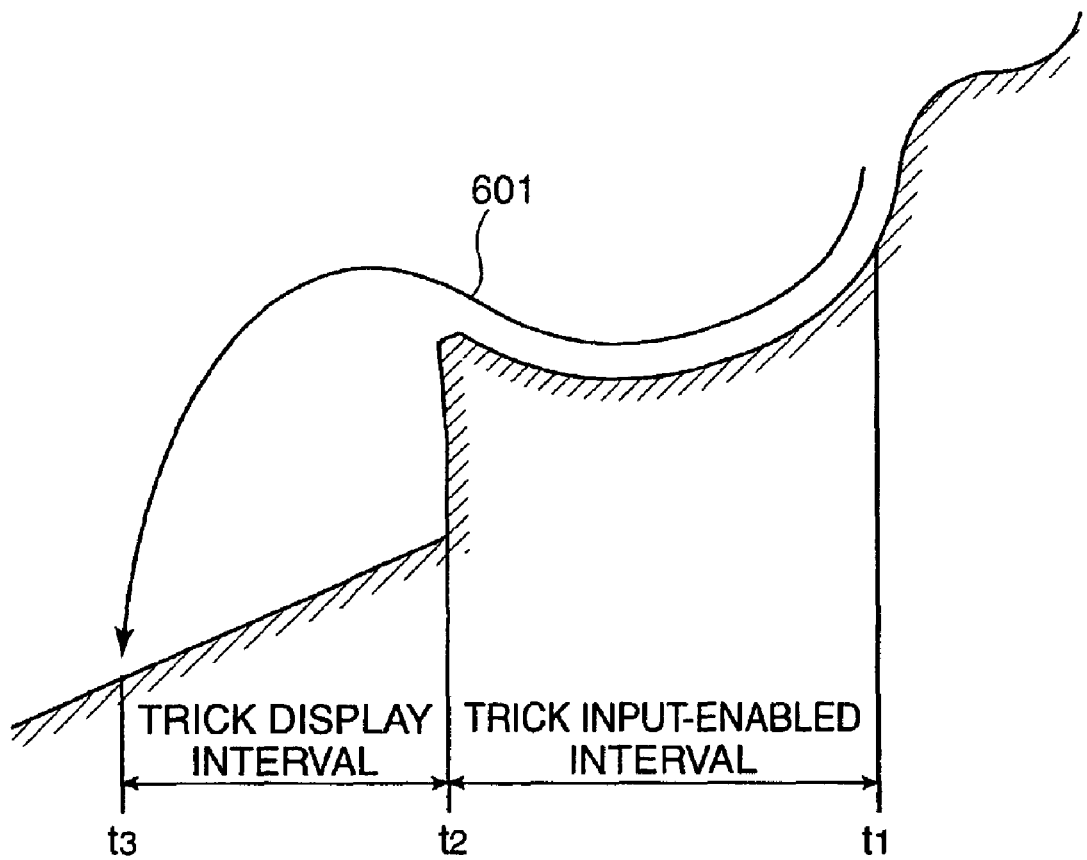
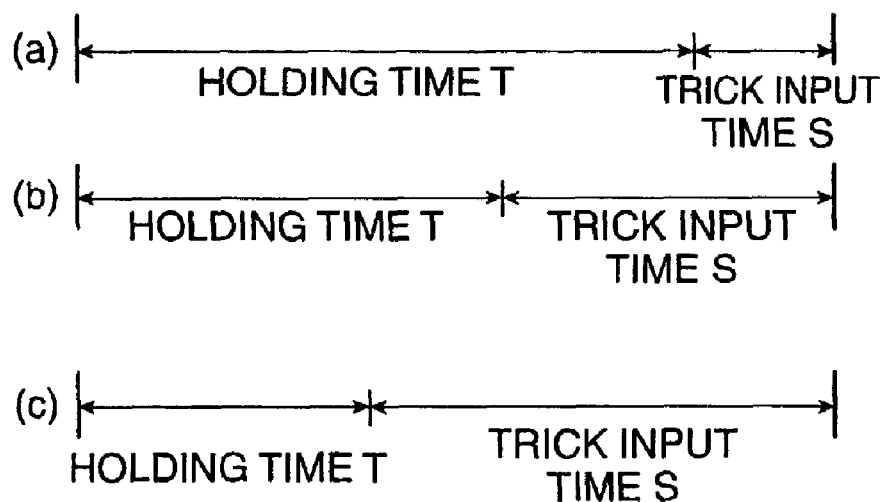

RECORDING MEDIUM STORING GAME PROCESS CONTROL PROGRAM, GAME PROCESS CONTROL PROGRAM, GAME PROCESS CONTROL METHOD, AND VIDEO GAME DEVICE

BACKGROUND OF THE INVENTION

1. Field of the Invention

This invention relates to a recording medium which stores a game progress control program, a game progress control program, game progress control method, and video game device which enable a player to perform operations associated with the progress of a video game (in particular, video games which simulate sports).

2. Description of the Related Art

Video game devices which enable a player to manipulate a character performing sports or other actions in a video game space to play a video game are widely known. In such sports games, the player, grasping with both hands a controller which is the means of operation, can operate a cross-shaped operation key or similar provided on the controller to move the position of the character in the video game space, or can operate other buttons to cause a character to jump or perform tricks or other movements. Also, by operating specific buttons, keys or similar determined in advance, in an order set in advance and at a prescribed speed, the player can cause a character to perform an action associated with the operation.

However, in the conventional video game device described above, appropriate operations are set in advance depending on the game environment, so that a player competes to master appropriate operations set for each game environment and to execute operation techniques in which appropriate operations are performed accurately. That is, conventionally, the goal for continuously playing a video game has been for the player to improve his knowledge regarding operations and to improve operation technique. Hence there is little consideration of strategy when playing a video game, and consequently boredom occurs readily, and there are limits to the appeal of the game.

SUMMARY OF THE INVENTION

The present invention was devised in light of the above problems, and has as an object the provision of a game progress control program, game progress control method, and video game device in which the strategy of a player is reflected in the video game, and which have excellent game properties.

One form of the present invention takes a form of a video game device, comprising operating means which is operated by the player, is made to function as: procedure storage means for storing a plurality of operation procedures of the operating means; operation determination means for determining from among the plurality of operation procedures stored in the above procedure storage means, one operation procedure corresponding to operations from the above operating means performed within a prescribed period of time; time calculation means for calculating a holding time for holding the last operation performed in an operation procedure selected by the above operation determination means; and, point-awarding means for awarding points based on the determination result of the above operation determination means and the above holding time.

According to the invention as described in the above, a video game device comprising operating means which is operated by the player is made to function as procedure storage means, which stores a plurality of operation procedures of the operating means; operation determination means, which selects one operation procedure from a plurality of operation procedures stored by the procedure storage means; time calculation means, which calculates the holding time for which the last operation performed as an operation procedure selected by the operation determination means is held; and, point-awarding means, which awards points based on the decision result of the operation determination means and the holding time.

That is, a plurality of operation procedures of the operating means are stored by the procedure storage means; the operation determination means selects, as an operation procedure equivalent to operations from the operating means performed within a prescribed period of time, one operation procedure from among a plurality of operation procedures stored by the procedure operating means; and the holding time for which the last operation performed as an operation procedure selected by the operation determination means has been held is calculated. Further, the point-awarding means awards points based on the decision result of the operation determination means and on the holding time.

Hence by means of the point-awarding means, points are awarded based on the decision result of the operation determination means and on the holding time, so that if, for example, the more complicated the operation procedure in a decision result, the higher the points awarded, and the longer the holding time, the higher the points awarded, then in addition to the operation technique of performing complicated operations in a short length of time, the player must also improve strategy with respect to which operation procedures to perform; so that the video game has excellent game properties, in which player strategies are reflected in the game.

These and other objects, features, and advantages of the present invention will become more apparent upon reading the following detailed description along with the accompanying drawings.

BRIEF DESCRIPTION OF THE DRAWINGS

FIG. 8 shows one example of an operation procedure for a group 5 trick (feat);

FIG. 13 is a drawing to explain operations from a controller performed within a prescribed length of time;

DESCRIPTION OF THE PREFERRED EMBODIMENTS

Figure 1:
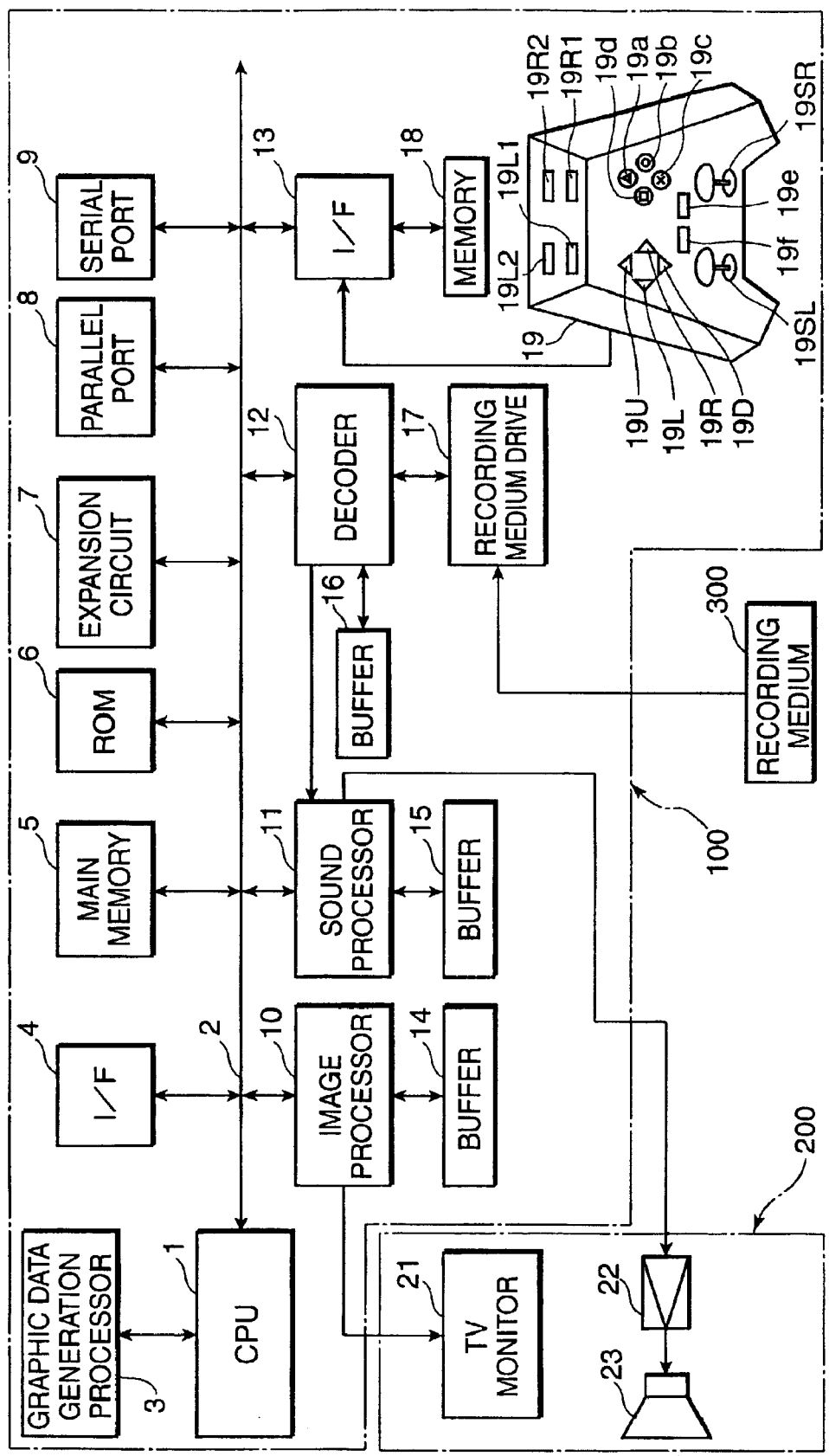
FIG. 1 is a block diagram showing the configuration of one aspect of a video game device of this invention.

FIG. 1 is a block diagram showing the configuration of one aspect of a video game device of this invention. In the following explanation, as an example of a video game device, a home-use video game system configured by connecting home-use video game equipment to a home-use television set is explained. However, this invention is not limited to the above configuration, but can be similarly applied to commercial video game equipment configured with an integral monitor, to a personal computer which executes a video game program to function as video game equipment, and similar.

The video game device of FIG. 1 comprises home-use game equipment 100 and a home-use television set 200. Computer-readable recording medium 300, on which is recorded a video game program and game data, is loaded into the home-use game equipment 100, and the video game program and game data are read as appropriate to execute the game.

The home-use game system 100 comprises a CPU (central processing unit) 1, bus line 2, graphic data generation processor 3, interface circuit (I/F) 4, main memory 5, ROM (read-only memory) 6, expansion circuit 7, parallel port 8, serial port 9, image processor 10, sound processor 11, decoder 12, interface circuit 13, buffers 14 to 16, recording medium drive 17, memory 18, and controller 19. The home-use television set 200 comprises a television monitor 21 (hereinafter also called a monitor), amplifier circuit 22, and speaker 23.

The CPU 1 is connected to the bus line 2 and the graphic data generation processor 3. The bus line 2 comprises an address bus, data bus, and control bus, and interconnects the CPU 1, interface circuit 4, main memory 5, ROM 6, expansion circuit 7, parallel port 8, serial port 9, image processor 10, sound processor 11, decoder 12, and interface circuit 13.

The image processor 10 is connected to the buffer 14. The sound processor 11 is connected to the buffer 15. The decoder 12 is connected to the buffer 16 and to the recording medium drive 17. The interface circuit 13 is connected to the memory 18 and controller 19.

The television monitor 21 of the home-use television set 200 is connected to the image processor 10. The speaker 23 is connected to the sound processor 11 via the amplifier circuit 22.

Next, each of the constituent components shown in FIG. 1 is explained. The graphic data generation processor 3 plays the role of a so-called coprocessor to the CPU 1. Specifically, the graphic data generation processor 3 performs coordinate transformation processing, light source calculation processing and similar, performing, for example, fixed-point matrix and vector operations through parallel processing.

The main processing performed by the graphic data generation processor 3 includes computing address data for an image for processing in a prescribed display area and returning the results to the CPU 1, processing to calculate the brightness of an image according to the distance from a virtually set light source, and similar, based on the coordinate data, movement data, rotation data and similar for each vertex of image data provided by the CPU 1 in two-dimensional or three-dimensional space.

The interface circuit 4 is used as the interface with peripheral devices such as, for example, a mouse, trackball, or other pointing device or similar. The main memory 5 comprises RAM (random access memory) or similar. The ROM 6 stores a program which serves as the operating system of the video game device. This program corresponds to, for example, the BIOS (basic input-output system) of a personal computer.

The expansion circuit 7 performs decompressions processing of compressed image data, compressed by means of intra-coding conforming to the MPEG (Moving Picture Engineering Group) standard for moving images and the JPEG (Joint Picture Engineering Group) standard for still images. Decompression processing comprises decoding (decoding of data encoded using a VLC, or variable-length code), inverse quantization processing, IDCT (inverse discrete cosine transform) processing, and processing to restore intra-image data.

The image processor 10 performs imaging (drawing) processing on a buffer 14 based on an imaging (drawing) instruction, issued by the CPU 1 at prescribed time intervals T (for example at each frame, T=1/60second).

The buffer 14 comprises RAM, for example, and is divided into a display area (frame buffer) and non-display area. The display area comprises an expansion area for data to be displayed on the display screen of the television monitor 21. The non-display area comprises storage areas for data defining skeletons, model data defining polygons, animation data which causes models to move, pattern data indicating the content of each animation, texture data, and color palette data.

Here, the texture data is two-dimensional image data; color palette data is data used to specify colors for texture and other data. This data is recorded in the non-display area of the buffer 14 by the CPU 1 from the recording medium 300, either all at once, or in several operations according to the game progress.

Also, as drawing instructions, there are rending instructions to render a three-dimensional image using polygons, and drawing instructions to render ordinary two-dimensional images. As polygons, polygonal two-dimensional virtual figures such as triangles are used.

Drawing instructions to render a three-dimensional image using polygons are performed for polygon vertex address data, indicating the stored positions of polygon vertex coordinate data in the display area of the buffer 14; texture address data, indicating the storage positions in the buffer 14 of texture data for application to polygons; color palette address data, indicating the storage positions in the buffer 14 of color palette data representing the colors for texture data; and brightness data, indicating the brightness of textures.

Of the above data types, polygon vertex address data in the display area is polygon vertex coordinate data in a two-dimensional plane obtained by coordinate transformation of polygon vertex coordinate data in a three-dimensional space, which the graphic data generation processor 3 outputs from the CPU 1 based on movement data and rotation data. Brightness data is data determined by the graphic data generation processor 3, based on the distance from the positions represented by the polygon vertex coordinate data after the above coordinate transformations to a virtually positioned light source.

The polygon vertex address data indicates addresses in the display area of the buffer 14; the image processor 10 performs processing to write texture data corresponding to a display area of the buffer 14 indicated by three polygon vertex address data values.

Here a character or other object in the game space consists of a plurality of polygons; the CPU 1 stores coordinate data in three-dimensional space for each polygon in the buffer 14, associated with corresponding skeleton vector data. When a character is moved, a character action is represented, or the viewpoint of a character is changed on a game screen displayed by the television monitor 21 according to operation of the controller 19, described below, the following processing is performed.

The CPU 1 provides the graphic data generation processor 3 with three-dimensional coordinate data of the vertices of each polygon held in the non-display area of the buffer 14, and with movement data and rotation data for each polygon, computed from the skeleton coordinate data and rotation data. The graphic data generation processor 3 calculates in order three-dimensional coordinate data after movement and rotation of each polygon, based on the three-dimensional coordinate data of the vertices of each polygon and on movement data and rotation data.

Of the three-dimensional coordinate data for each polygon computed in this way, coordinate data in the horizontal and vertical directions is supplied to the image processor 10 as address data in the display area of the buffer 14, that is, as polygon vertex address data.

The image processor 10 writes texture data specified by texture address data allocated in advance to triangular-shape display areas in the buffer 14 indicated by three polygon vertex address data values. By this means, an object, represented by a plurality of polygons to which texture data is applied, is represented on the display screen of the television monitor 21.

Drawing instructions to render normal two-dimensional images are performed for vertex address data, texture address data, color palette address data indicating the storage position in the buffer 14 of color palette data representing the color of texture data, and brightness data indicating the brightness of a texture. Of these data types, vertex address data is coordinate data obtained by coordinate transformation of vertex coordinate data on a two-dimensional plane output by the graphic data generation processor 3 from the CPU 1, based on movement data and rotation data output from the CPU 1.

The sound processor 11 stores ADPCM (adaptive differential pulse code modulation) data read from the recording medium 300 in the buffer 15, and ADPCM data stored in the buffer 15 is used as a sound source.

The sound processor 11 reads ADPCM data from the buffer 15 based on, for example, a clock signal of frequency 44.1 kHz, performs processing of the ADPCM data read in this way such as pitch conversion, noise addition, envelope setting, level setting, and reverb addition, and then outputs the corresponding audio from the speaker 23.

On the other hand, when audio data read from the recording medium 300 is CD-DA (Compact Disc Digital Audio) or other PCM data, the sound processor 11 converts this PCM data into ADPCM data. Processing of PCM data by the program is performed directly in main memory 5. The PCM data processed in main memory 5 is supplied to the sound processor 11, and after conversion into ADPCM data, the various processing described above is performed, and audio is output from the speaker 23.

As a recording medium drive 17, for example, a DVD-ROM drive, CD-ROM drive, hard disk drive, optical disc drive, flexible disk drive, silicon disk drive, cassette medium reading equipment, or similar is used. In this case, as the recording medium 300, a DVD-ROM disc, CD-ROM disc, hard disk, optical disc, flexible disk, semiconductor memory, or similar is used.

The recording medium drive 17 reads image data, audio data and program data from the recording medium 300, and provides the read data to the decoder 12. The decoder 12 uses an error correction code (ECC) to perform error correction processing of the data reproduced from the recording medium drive 17, and supplies the error-corrected data to main memory 5 or to the sound processor 11.

As memory 18, for example, card-type memory may be used. Card-type memory is used to hold various game parameters at a point of interruption, as for example when holding the state at the point of interruption when the video game is interrupted.

The controller 19 is an operating device used by a player to input various operation instructions; operation signals corresponding to player operations are sent to the CPU 1.

Next, the action of the above video game device is explained in summary. When recording medium 300 is loaded into the recording medium drive 17, the power supply switch (not shown) is turned on and power is supplied to the video game device, the CPU 1 instructs the recording medium drive 17 to read the game program from the recording medium 300, based on the operating system stored in ROM 6. By this means, the recording medium drive 17 reads image data, audio data, and program data from the recording medium 300. The image data, audio data and program data thus read is supplied to the decoder 12, and the decoder 12 performs error correction processing for the different data types.

Image data which has been error-corrected by the decoder 12 is supplied to a expansion circuit 7 via a bus line 2. Image data on which decompressions processing described above has been performed by the expansion circuit 7 is supplied to the imaging processor 10, and is written to the non-display area of the buffer 14 by the imaging processor 10. Audio data which has been error-corrected by the decoder 12 is written either to the main memory 5, or to the buffer 15 via the sound processor 11. Program data which has been error-corrected by the decoder 12 is written to the main memory 5.

Subsequently, the CPU 1 advances the video game based on the game program stored in main memory 5 and on the instructions issued by the player using the controller 19. That is, the CPU 1 appropriately controls image processing, audio processing, and internal processing based on instructions issued by the player using the controller 19.

As image processing control, for example, calculations of the coordinates of each skeleton from pattern data corresponding to animation specified for a character, calculation of vertex coordinate data for polygons, provision of the resulting three-dimensional coordinate data and viewpoint position data to the graphic data generation processor 3, issuing of drawing instructions including address data and brightness data in the display area of the buffer 14 and calculated by the graphic data generation processor 3, and similar are performed. As audio processing control, for example, the issuing of audio output commands to the sound processor 11, and level, reverb and other specifications are performed. As internal processing control, for example, computations are performed according to operation of the controller 19.

In this aspect, the case is explained in which the video game executed by the video game device 1 is a video game which simulates mogul skiing, which is one kind of freestyle skiing. In mogul skiing, a plurality of bumps provided by heaping snow up on the course are navigated by turning rhythmically, and "air points" are awarded by performing an "air trick" (feat) from jump platforms provided at two places on the course. The actual points awarded include points for turns, air points, and speed points; players compete on the basis of the total of these points.

Figure 2:
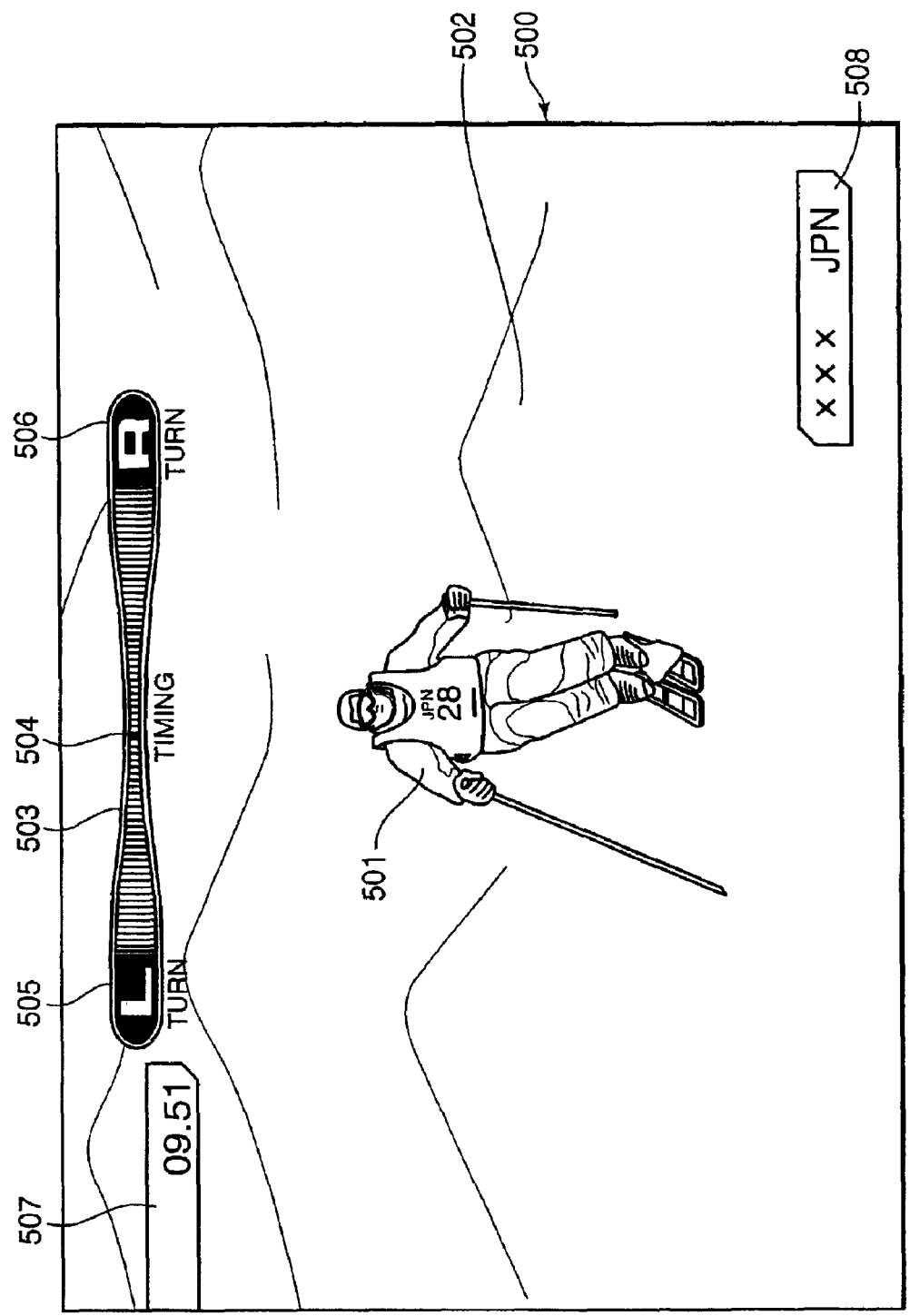
FIG. 2 is a screen diagram showing one example of a game screen in which a character skis on a bumpy slope.

FIG. 2 is a screen diagram showing one example of a game screen in which a character skis on a bumpy slope. In the game screen 500, when the player operates the controller 19 with good timing, the character 501 is displayed skiing around bumps 502. The player performs operations according to the movements of a timing indicator 504 displayed moving left and right within the timing gauge 503 displayed at the top of the game screen 500. That is, the player presses the L1 button 19L1 on the controller 19 when the timing indicator 504 is at the L position 505, and presses the R1 button 19R1 when the timing indicator 504 is at the R position 506, to move the character 501. In this way, by pressing the L1 button 19L1 and R1 button 19R1 with good timing according to movements of the timing indicator 504 displayed in the timing gauge 503, the player causes the character 501 to be displayed skiing rapidly through turns, and the speed of the character 501 is increased.

The time displayed in the upper-left of the game screen 500 is the time display portion 507, which displays the movement time of the character 501 from the start; in the lower-right of the game screen 500 is a character name display portion 508, in which the "XXX" displays the character name of the character 501 being manipulated by the player, and "JPN" indicates the nationality of the character 501. Speed points are awarded according to the time displayed in the time display portion 507 when the character 501 reaches the finish line.

Figure 3:
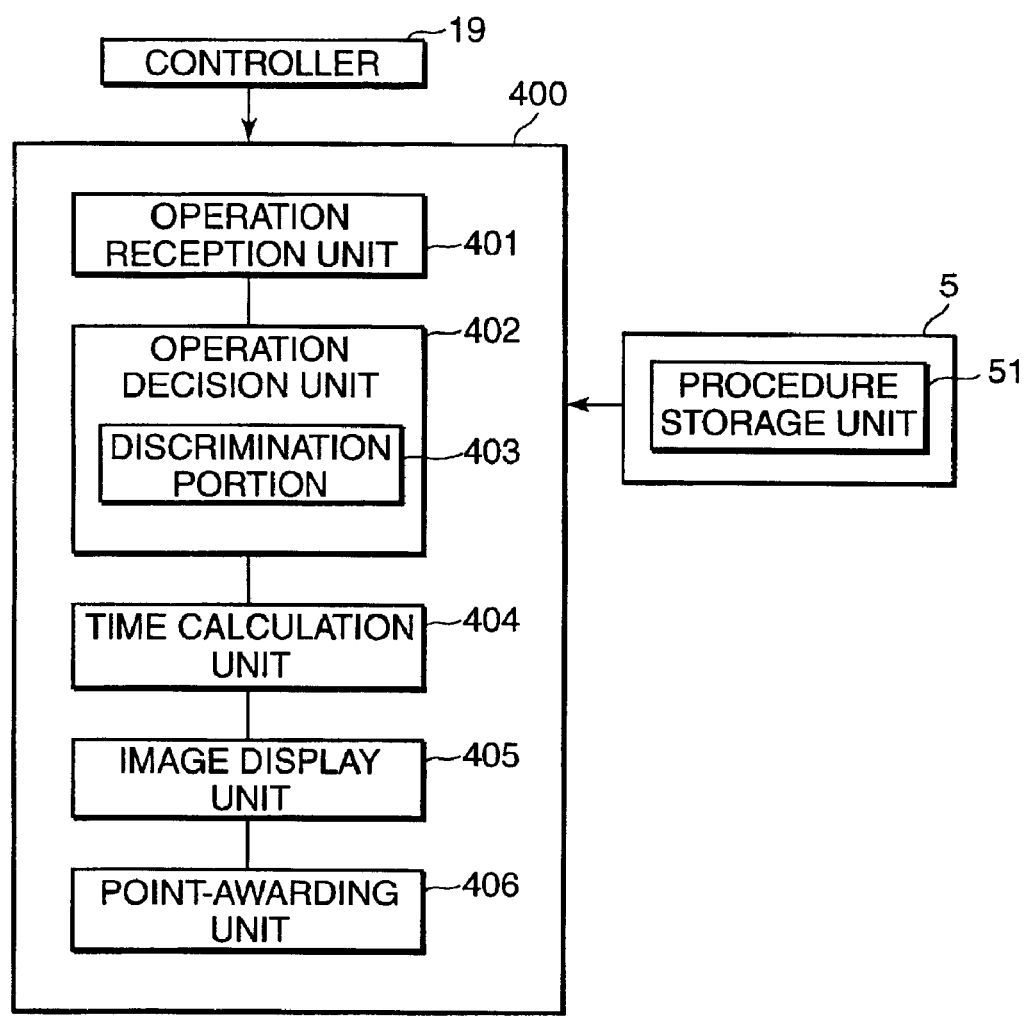
FIG. 3 is a functional block diagram of a video game device of this invention.

FIG. 3 is a functional block diagram of a video game device of this invention. The game progress control program of this invention is recorded in the recording medium 300 shown in FIG. 1, similarly to the above-described game program, and is loaded into main memory 5; the game progress control program is executed sequentially in main memory 5 by the CPU 1, while accepting operations performed by the player via the controller 19, in order to realize the various functions.

The video game device functionally comprises a program execution unit 400, a controller 19 comprising a plurality of operation portions, and main memory 5.

The program execution unit 400 comprises, for example, the CPU 1; by executing the game progress control program stored in main memory 5, the CPU 1 functions as an operation reception unit 401, operation decision (determination) unit 402, time calculation unit 404, image display unit 405, and point-awarding unit 406.

The operation reception unit 401 receives operations from the controller 19 performed within a prescribed length of time.

The operation decision unit 402 selects one operation procedure from among the operation procedures stored in the procedure storage unit 51, as the operation procedure corresponding to the operations from the controller 19. The operation decision unit 402 comprises a discrimination portion 403. The discrimination portion 403 discriminates valid operations, which are operations included in an operation procedure, and invalid operations not included in the operation procedure. An operation discriminated by the discrimination portion 403 as an invalid operation is not determined as having been performed. Also, when operations from the controller 19 are equivalent to a plurality of operation procedures, the operation decision unit 402 selects the longest operation procedure.

The time calculation unit 404 calculates the holding time, which is the continuous time over which the last operation of an operation procedure selected by the operation decision unit 402 is performed from the controller 19 within a prescribed length of time.

The image display unit 405 displays on the game screen an image for the decision result of the operation decision unit 402. The image display unit 405 displays on the game screen an image representing the action of a character appearing in the video game.

The point-awarding unit 406 awards points based on the decision result of the operation decision unit 402 and on the holding time.

The main memory 5 functions as the procedure storage unit 51. The procedure storage unit 51 stores a plurality of operation procedures, where each operation procedure is represented by a combination of at least one operation.

The controller 19 is provided with a first button 19a; second button 19b; third button 19c; fourth button 19d; up key 19U; down key 19D; left key 19L; right key 19R; L1 button 19L1; L2 button 19L2; R1 button 19R1; R2 button 19R2; start button 19e; select button 19f; left joystick 19SL; and right joystick 19SR.

The up key 19U, down key 19D, left key 19L and right key 19R are used, for example, to sends commands to the CPU 1 to move a character or cursor up, down, left, or right on the screen of the monitor 21. The start button 19e is used to instruct the CPU 1 to load the game program from the recording medium 300. The select button 19f is used to instruct the CPU 1 to make various selections relating to the game program loaded into main memory 5 from the recording medium 300. Except for the left joystick 19SL and right joystick 19SR, each of the buttons and keys of the controller 19 is configured so as to be turned on by applying a depressing force from outside to press down from a neutral position, and to be turned off on releasing the depressing force, resulting in a return to the above neutral position.

The left joystick 19SL and right joystick 19SR are a pair of operation members capable of input of operation directions; both function as a joystick or as a game pad, which is a stick-type controller. Operation directions include linear directions and turning directions. These stick-type controllers have an upright stick; the stick, supported at a prescribed position, is configured to enable inclination through 360°, including forward, backward, left, and right. The left joystick 19SL and right joystick 19SR send, to the CPU 1 via the interface circuit 13, operation signals which are values of the x coordinate in the lateral direction and the y coordinate in the anteroposterior direction, according to the direction and angle of inclination of the stick, with the upright position as the origin. The first button 19a, second button 19b, third button 19c, fourth button 19d, L1 button 19L1, L2 button 19L2, R1 button 19R1, and R2 button 19R2 function in various manners depending on the game program loaded from the recording medium 300. The player grips the controller 19 with both hands, operates the left joystick 19SL with the thumb of the left hand, operates the right joystick 19SR with the thumb of the right hand, and tilts the left joystick 19SL and/or the right joystick 19SR.

In this way, the player can perform complicated operations by using the left joystick 19SL and right joystick 19SR, which are a pair of operation members enabling input of an operation direction, so that the video game has diversified operations and excellent game properties.

In this aspect, the procedure storage unit 51 is equivalent to the procedure storage means, the operation reception unit 401 and operation decision unit 402 are equivalent to the operation determination means, the discrimination portion 403 is equivalent to the discrimination means, the time calculation unit 404 is equivalent to the time calculation means, the image display unit 405 is equivalent to the image display means, and the point-awarding unit 406 is equivalent to the point-awarding means.

Also, there are a plurality of types of the above tricks; each trick belongs to one of eight groups according to difficulty, and a mogul competitor must normally perform tricks belonging to different groups according to the two "air" tricks. The tricks belonging to group 1 include the spread-eagle, kosak, and zudnik. Tricks belonging to group 2 include the daffy. Tricks belonging to group 3 include the backscratcher and mule kick. Tricks belonging to group 4 include the twister. Tricks belonging to group 5 include the 360° rotation helicopter. Tricks belonging to group 6 include the helicopter in a different posture. Tricks belonging to group 7 include the 720° rotation helicopter. Tricks belonging to group 8 include the 720° rotation helicopter in a different posture. These tricks generally are of greater difficulty, and have higher awarded points, as the group number increases.

FIGS. 4 through 11 show examples of operation procedures for tricks (feats) in different groups.

FIG. 4 shows one example of an operation procedure for a group 1 trick (feat). The operation procedure 511 shown in FIG. 4A is the operation procedure for a trick called a spread-eagle. 19SL corresponds to movement of the left joystick 19SL of the controller 19, 19SR corresponds to movement of the right joystick 19SR of the controller 19, the arrow 512 indicates the direction in which the left joystick 19SL is tilted, and the arrow 513 represents the direction in which the right joystick 19SR is tilted. When performing this spread-eagle trick, the player tilts the left joystick 19SL in the direction of the arrow 512 (the left direction), and at the same time tilts the right joystick 19SR in the direction of the arrow 513 (the right direction).

Figure 4A:
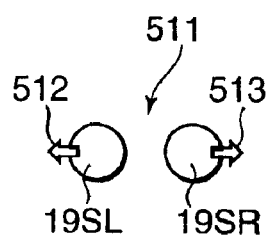
FIGS. 4A–4D shows a sequence of operations of one example of an operation procedure for a group 1 trick (feat)
Figure 4B:
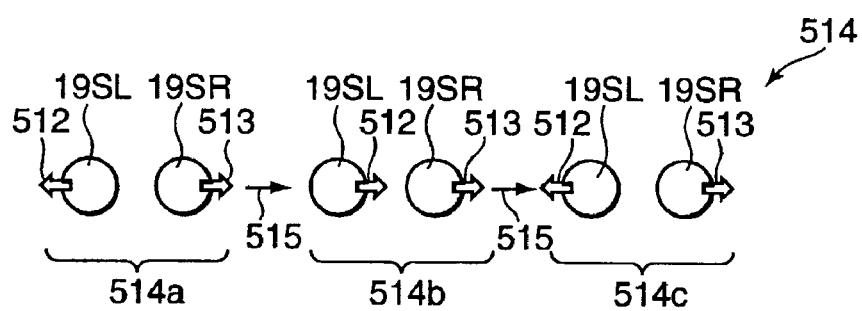

The operation procedure 514 shown in FIG. 4B is the operation procedure for a trick called a spread twister spread. The arrow 515 indicates the order in which the operations of the operation procedure 514 are performed; in the operation procedure 514, first the operation 514a is performed, then the operation 514b is performed, and then the operation 514c is performed. That is, when performing the spread twister spread trick, the player tilts the left joystick 19SL in the direction of the arrow 512 (the left direction) while tilting the right joystick 19SR in the direction of the arrow 513 (right direction) (operation 514a); then tilts the left joystick 19SL in the direction of the arrow 512 (right direction) while tilting the right joystick 19SR in the direction of the arrow 513 (right direction) (operation 514b); and then tilts the left joystick 19SL in the direction of the arrow 512 (the left direction) while tilting the right joystick 19SR in the direction of the arrow 513 (the right direction) (operation 514c).

In this way, when performing the spread eagle and other so-called single jump actions, one operation is performed, and when performing a spread twister spread or other double or greater jump actions, a plurality of single jump operations are combined to become an operation procedure.

Figure 4C:
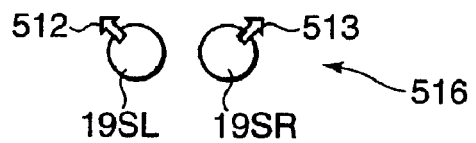

The operation procedure 516 shown in FIG. 4C is the operation procedure for a trick called the kosak. When performing this kosak trick, the left joystick 19SL is tilted in the direction of the arrow 512 (diagonally left-upward at 45°), and at the same time the right joystick 19SR is tilted in the direction of the arrow 513 (diagonally right-upward at 45°).

Figure 4D:
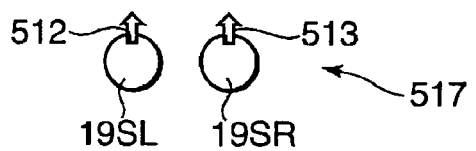

The operation procedure 517 shown in FIG. 4D is the operation procedure of a trick called the zudnik. When performing the zudnik trick, the player tilts the left joystick 19SL in the direction of the arrow 512 (upward) while tilting the right joystick 19SR in the direction of the arrow 513 (upward).

Figure 5A:
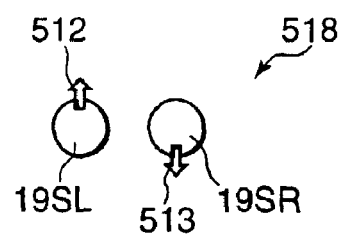
FIGS. 5A–5C shows a sequence of operations of one example of an operation procedure for a group 2 trick (feat)

FIG. 5 shows one example of an operation procedure for a group 2 trick (feat). The operation procedure shown in FIG. 5A is the operation procedure 518 for a trick called a daffy. When performing this daffy trick, the player tilts the left joystick 19SL in the direction of the arrow 512 (upward), while tilting the right joystick 19SR in the direction of the arrow 513 (downward).

Figure 5B:
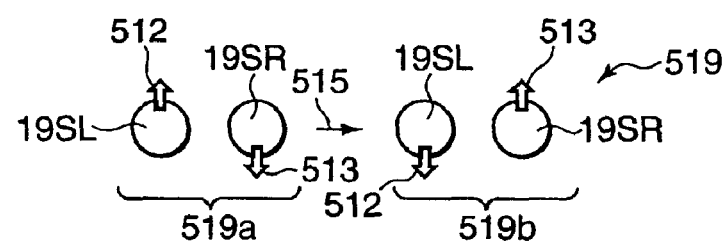

The operation procedure 519 shown in FIG. 5B is the operation procedure for a trick called the double daffy. In the operation procedure 519, first the operation 519a is performed, and then the operation 519b is performed. That is, when performing the double daffy trick, the player tilts the left joystick 19SL in the direction of the arrow 512 (upward) while tilting the right joystick 19SR in the direction of the arrow 513 (downward) (operation 519a), and then tilts the left joystick 19SL in the direction of the arrow 512 (downward) while tilting the right joystick 19SR in the direction of the arrow 513 (upward) (operation 519b).

Figure 5C:
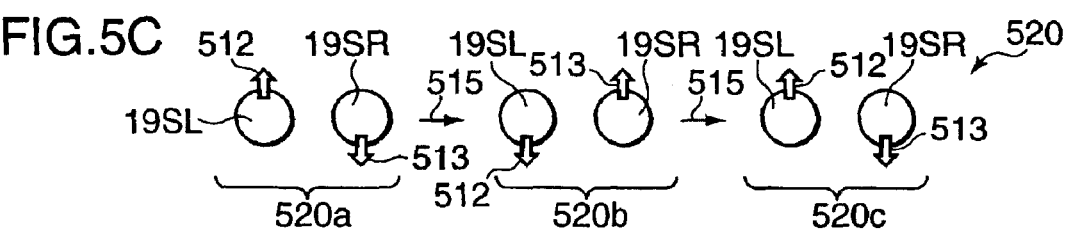

The operation procedure 520 shown in FIG. 5C is the operation procedure for a trick called the triple daffy. In the operation procedure 520, first the operation 520a is performed, then the operation 520b is performed, and then the operation 520c is performed. That is, when performing the triple daffy trick, first the player tilts the left joystick 19SL in the direction of the arrow 512 (upward), while tilting the right joystick 19SR in the direction of the arrow 513 (downward) (operation 520a); then tilts the left joystick 19SL in the direction of the arrow 512 (downward) while tilting the right joystick 19SR in the direction of the arrow 513 (upward) (operation 520b); and then tilts the left joystick 19SL in the direction of the arrow 512 (upward) while tilting the right joystick 19SR in the direction of the arrow 513 (downward) (operation 520c).

FIG. 6 shows one example of an operation procedure for a group 3 trick (feat). The operation procedure 521 shown in FIG. 6A is the operation procedure for a trick called the backscratcher. When performing this backscratcher trick, the player tilts the left joystick 19SL in the direction of the arrow 512 (downward), while tilting the right joystick 19SR in the direction of the arrow 513 (downward).

Figure 6A:
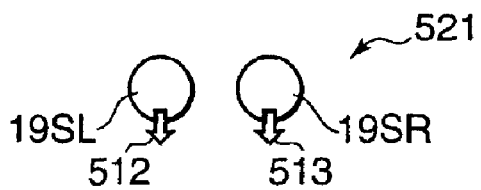
FIGS. 6A–6D shows a sequence of operations of one example of an operation procedure for a group 3 trick (feat)
Figure 6B:
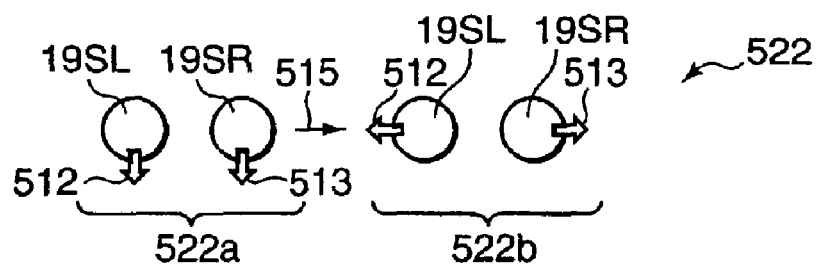

The operation procedure 522 shown in FIG. 6B is the operation procedure for a trick called the backscratcher-to-a-spread eagle. In the operation procedure 522, first the operation 522a is performed, and then the operation 522b is performed. That is, when performing the backscratcher-to-a-spread eagle, first the player tilts the left joystick 19SL in the direction of the arrow 512 (downward) while tilting the right joystick 19SR in the direction of the arrow 513

(downward) (operation 522*a*), and then tilts the left joystick 19SL in the direction of the arrow 512 (left) while tilting the right joystick 19SR in the direction of the arrow 513 (right) (operation 522*b*).

Figure 6C:
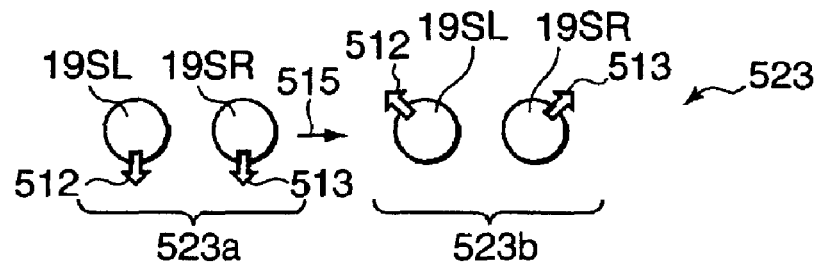

The operation procedure 523 shown in FIG. 6C is the operation procedure for a trick called the backscratcher-to-a-kosak. In the operation procedure 523, first the operation 523*a* is performed, and then the operation 523*b* is performed. That is, when performing the backscratcher-to-a-kosak, first the player tilts the left joystick 19SL in the direction of the arrow 512 (left) while tilting the right joystick 19SR in the direction of the arrow 513 (downward) (operation 523*a*), and then tilts the left joystick 19SL in the direction of the arrow 512 (diagonally left-upward at 45°) while tilting the right joystick 19SR in the direction of the arrow 513 (diagonally right-upward at 45°) (operation 523*b*).

Figure 6D:
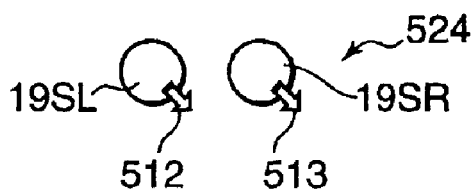

The operation procedure 524 shown in FIG. 6D is the operation procedure for a trick called the mule kick. When performing this mule kick trick, the player tilts the left joystick 19SL in the direction of the arrow 512 (diagonally right-upward at 45°) while tilting the right joystick 19SR in the direction of the arrow 513 (diagonally right-upward at 45°).

FIG. 7 shows one example of an operation procedure for a group 4 trick (feat). The operation procedure 525 shown in FIG. 7A is the operation procedure for a trick called the twister. When performing this twister trick, the player tilts the left joystick 19SL in the direction of the arrow 512 (right), while tilting the right joystick 19SR in the direction of the arrow 513 (right).

Figure 7A:
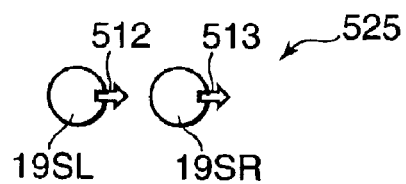
FIGS. 7A–7D shows a sequence of operations of one example of an operation procedure for a group 4 trick (feat)
Figure 7B:
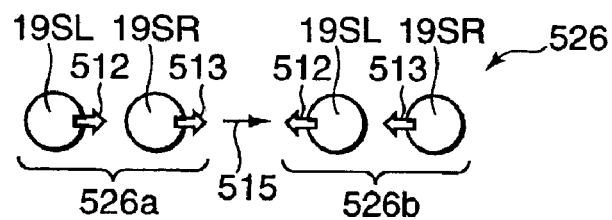

The operation procedure 526 shown in FIG. 7B is the operation procedure for a trick called the double twister. In the operation procedure 526, first the operation 526*a* is performed, and then the operation 526*b* is performed. That is, when performing the double twister trick, the left joystick 19SL is tilted in the direction of the arrow 512 (right) while tilting the right joystick 19SR in the direction of the arrow 513 (right) (operation 526*a*), and then the left joystick 19SL is tilted in the direction of the arrow 512 (left) while tilting the right joystick 19SR in the direction of the arrow 513 (left) (operation 526*b*).

Figure 7C:
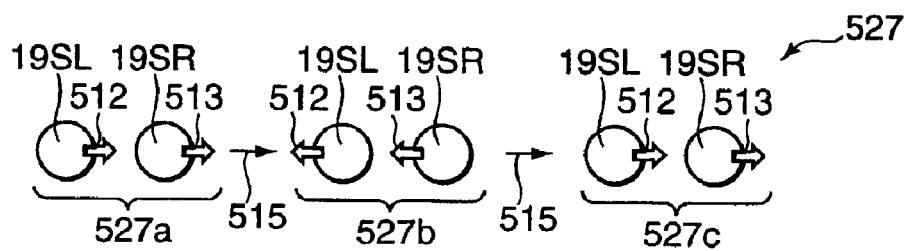

The operation procedure 527 shown in FIG. 7C is the operation procedure for a trick called the triple twister. In the operation procedure 527, first the operation 527*a* is performed, then the operation 527*b* is performed, and then the operation 527*c* is performed. That is, when performing the triple twister trick, the player tilts the left joystick 19SL in the direction of the arrow 512 (right) while tilting the right joystick 19SR in the direction of the arrow 513 (right) (operation 527*a*), then tilts the left joystick 19SL in the direction of the arrow 512 (left) while tilting the right joystick 19SR in the direction of the arrow 513 (left) (operation 527*b*), and then tilts the left joystick 19SL in the direction of the arrow 512 (right) while tilting the right joystick 19SR in the direction of the arrow 513 (right) (operation 527*c*).

Figure 7D:
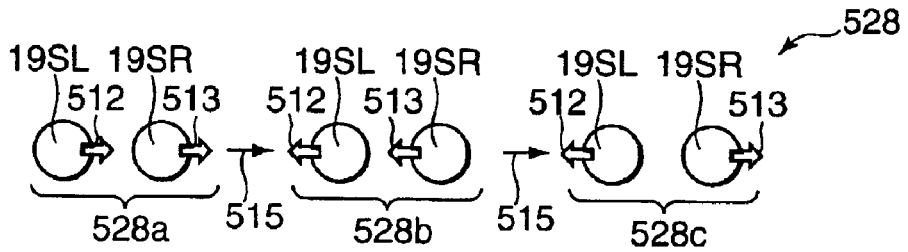

The operation procedure 528 shown in FIG. 7D is the operation procedure for a trick called the twister-twister spread. In the operation procedure 528, first the operation 528*a* is performed, then the operation 528*b* is performed, and then the operation 528*c* is performed. That is, when performing the twister-twister spread, the player tilts the left joystick 19SL in the direction of the arrow 512 (right) while tilting the right joystick 19SR in the direction of the arrow 513 (right) (operation 528*a*), then tilts the left joystick 19SL in the direction of the arrow 512 (left) while tilting the right joystick 19SR in the direction of the arrow 513 (left) (operation 528*b*), and then tilts the left joystick 19SL in the direction of the arrow 512 (left) while tilting the right joystick 19SR in the direction of the arrow 513 (right) (operation 528*c*).

FIG. 8 shows one example of an operation procedure for a group 5 trick. The operation procedure 529 shown in FIG. 8 is the operation procedure for a trick called the helicopter 360. The arrow 530 indicates the direction in which the left joystick 19SL is rotated; when performing this helicopter 360 trick, the player tilts the left joystick 19SL downward, and then makes a half-rotation to the left and upward.

FIG. 9 shows one example of an operation procedure for a group 6 trick. The operation procedure 531 shown in FIG. 9A is the operation procedure for a trick called the iron cross helicopter 360. In the operation procedure 531, firs the operation 531*a* is performed, and then the operation 531*b* is performed. That is, when performing the iron cross helicopter 360 trick, the player makes a half-rotation of the left joystick 19SL in the direction of the arrow 530 (operation 531*a*), and then tilts the left joystick 19SL in the direction of the arrow 512 (diagonally right-downward 45°) while tilting the right joystick 19SR in the direction of the arrow 513 (diagonally left-downward 45°) (operation 531*b*).

Figure 9A:
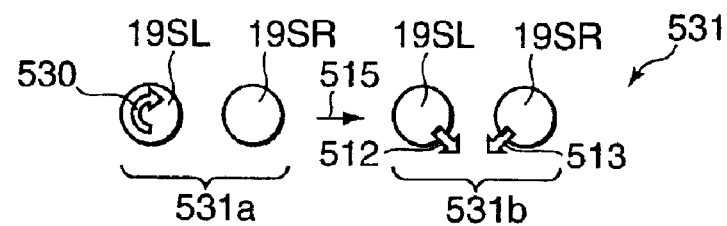
FIGS. 9A–9D shows a sequence of operations of one example of an operation procedure for a group 6 trick (feat)
Figure 9B:
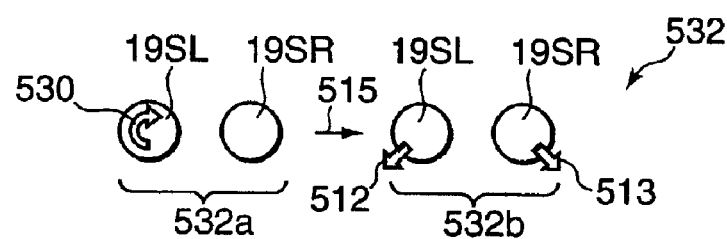

The operation procedure 532 shown in FIG. 9B is the operation procedure for a trick called the grab helicopter 360. In the operation procedure 532, first the operation 532*a* is performed, and then the operation 532*b* is performed. That is, when performing the grab helicopter 360 trick, the player makes a half-rotation of the left joystick 19SL in the direction of the arrow 530 (operation 532*a*), and then tilts the left joystick 19SL in the direction of the arrow 512 (diagonally left-downward 45°) while tilting the right joystick 19SR in the direction of the arrow 513 (diagonally right-downward 45°) (operation 532*b*).

Figure 9C:
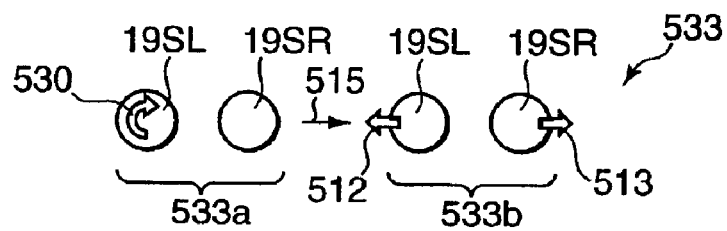

The operation procedure 533 shown in FIG. 9C is the operation procedure for a trick called the spread helicopter 360. In the operation procedure 533, first the operation 533*a* is performed, and then the operation 533*b* is performed. That is, when performing the spread helicopter 360 trick, the player makes a half-rotation of the left joystick 19SL in the direction of the arrow 530 (operation 533*a*), and then tilts the left joystick 19SL in the direction of the arrow 512 (left) while tilting the right joystick 19SR in the direction of the arrow 513 (right) (operation 533*b*).

Figure 9D:
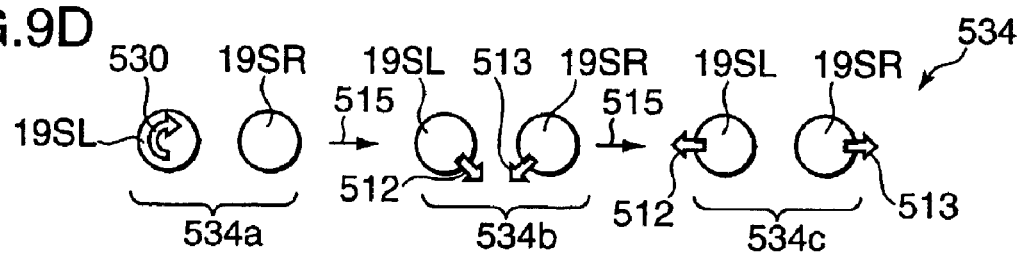

The operation procedure 534 shown in FIG. 9D is the operation procedure for a trick called the iron cross helicopter spread 360. In the operation procedure 534, first the operation 534*a* is performed, then the operation 534*b* is performed, and then the operation 534*c* is performed. That is, when performing the iron cross helicopter spread 360, the player makes a half-rotation of the left joystick 19SL in the direction of the arrow 530 (operation 534*a*); then tilts the left joystick 19SL in the direction of the arrow 512 (diagonally right-downward 45°) while tilting the right joystick 19SR in the direction of the arrow 513 (diagonally left-downward 45°) (operation 534*b*); and then tilts the left joystick 19SL in the direction of the arrow 512 (left) while tilting the right joystick 19SR in the direction of the arrow 513 (right) (operation 534*c*).

Figure 10:
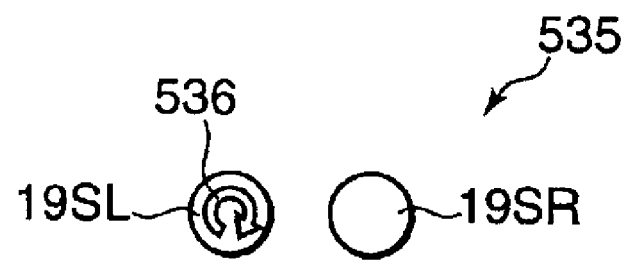
FIG. 10 shows one example of an operation procedure for a group 7 trick (feat)

FIG. 10 shows one example of an operation procedure for a group 7 trick. The operation procedure 535 shown in FIG. 10 is the operation procedure for a trick called the helicopter 720. The arrow 536 indicates the direction in which the left joystick 19SL is rotated; when performing this helicopter 720 trick, the player first tilts the left joystick 19SL downward, and then makes a full rotation beginning to the left.

FIG. 11 shows one example of an operation procedure for a group 8 trick. The operation procedure 537 shown in FIG. 11A is the operation procedure for a trick called the iron cross helicopter 720. In the operation procedure 537, first the operation 537a is performed, and then the operation 537b is performed. That is, when performing the iron cross helicopter 720 trick, the player makes one full rotation of the left joystick 19SL in the direction of the arrow 530 (operation 537a), and then tilts the left joystick 19SL in the direction of the arrow 512 (diagonally right-downward 45°) while tilting the right joystick 19SR in the direction of the arrow 513 (diagonally left-downward 45°) (operation 537b).

Figure 11A:
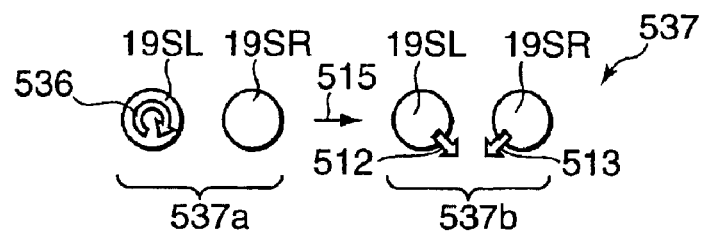
FIGS. 11A–11D shows a sequence of operations of one example of an operation procedure for a group 8 trick (feat)
Figure 11B:
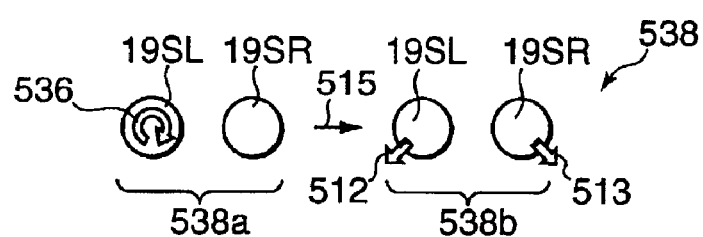

The operation procedure 538 shown in FIG. 11B is the operation procedure for a trick called the grab helicopter 720. In the operation procedure 538, first the operation 538a is performed, and then the operation 538b is performed. That is, when performing the grab helicopter 720 trick, the player makes a full rotation of the left joystick 19SL in the direction of the arrow 530 (operation 538a), and then tilts the left joystick 19SL in the direction of the arrow 512 (diagonally left-downward 45°) while tilting the right joystick 19SR in the direction of the arrow 513 (diagonally right-downward 45°) (operation 538b).

Figure 11C:
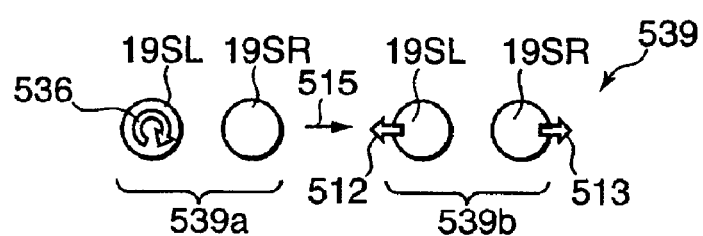

The operation procedure 539 shown in FIG. 11C is the operation procedure for a trick called the spread helicopter 720. In the operation procedure 539, first the operation 539a is performed, and then the operation 539b is performed. That is, when performing the spread helicopter 720 trick, the player makes a full rotation of the left joystick 19SL in the direction of the arrow 530 (operation 539a), and then tilts the left joystick 19SL in the direction of the arrow 512 (left) while tilting the right joystick 19SR in the direction of the arrow 513 (right) (operation 539b).

Figure 11D:
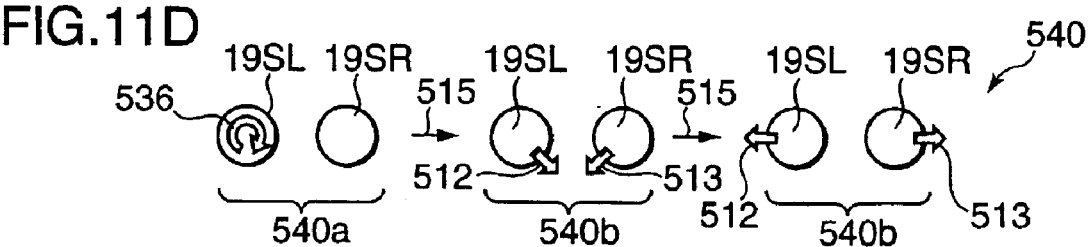

The operation procedure 540 shown in FIG. 11D is the operation procedure for a trick called the iron cross helicopter spread 720. In the operation procedure 540, first the operation 540a is performed, then the operation 540b is performed, and then the operation 540c is performed. That is, when performing the iron cross helicopter spread 720 trick, the player makes a full rotation of the left joystick 19SL in the direction of the arrow 530 (operation 540a); then tilts the left joystick 19SL in the direction of the arrow 512 (diagonally right-downward 45°) while tilting the right joystick 19SR in the direction of the arrow 513 (diagonally left-downward 45°) (operation 540b); and then tilts the left joystick 19SL in the direction of the arrow 512 (left) while tilting the right joystick 19SR in the direction of the arrow 513 (right) (operation 540c).

In this way, the higher the group number, the more complicated are the operation procedures, and the more difficult the input operation, so that more time is required for the input operation. These operation procedures are stored in the procedure storage unit 51.

Figure 12A:
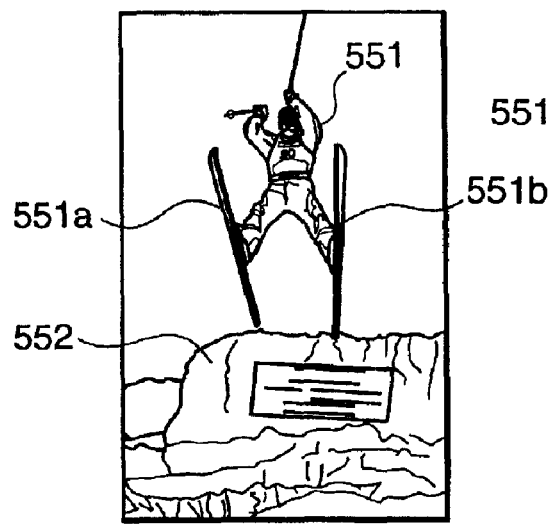
FIGS. 12A–12D show a sequence of maneuvers of a kosak feat which is one trick of group 1.
Figure 12B:
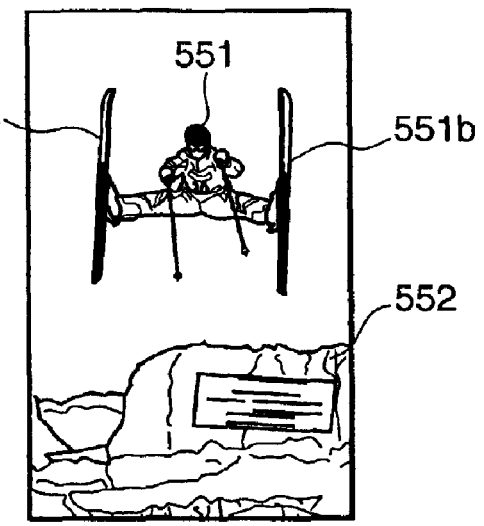
Figure 12C:
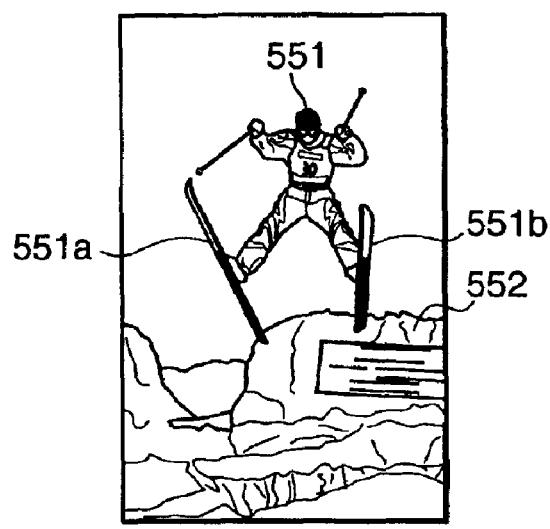
Figure 12D:
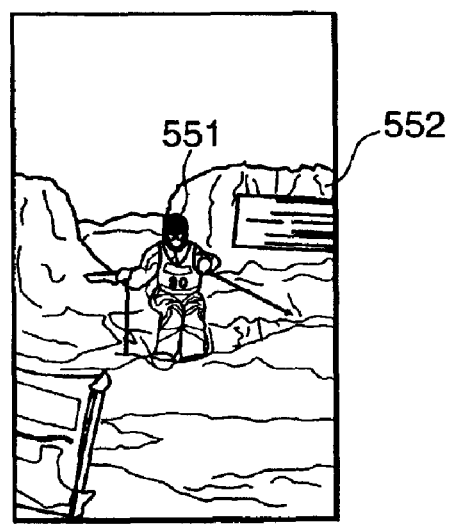

Operations using the controller 19 correspond to trick actions in an actual mogul run. FIG. 12 explains the kosak, which is a trick in group 1. In FIG. 12, FIG. 12A depicts a mogul competitor 551 immediately after leaving the jump platform 552; FIG. 12B depicts the competitor 551 at the instant the trick is performed; FIG. 12C depicts the competitor 551 immediately before landing; and FIG. 12D depicts the competitor 551 at the instant of landing. When the competitor 551 leaves the jump platform 552, trick actions are performed in the order shown in FIGS. 12A to 12D.

As shown in FIGS. 12A to 12D, the kosak is a trick in which the left leg 551a and right leg 551b are opened to the left and right in midair. In this way, the action of the competitor 551 of opening the left leg 551a and right leg 551b to the left and right corresponds to the operation in which the left joystick 19SL of the controller 19 is tilted diagonally left-upward 45° while tilting the right joystick 19SR diagonally right-upward 45°. When performing, for example, the daffy trick of group 2, the competitor 551 performs an action in which the left leg 551a and right leg 551b are opened forward and backward; as the input operation of the controller 19, the left joystick 19SL is tilted upward while the right joystick 19SR is tilted downward. In this way, the controller 19 is operated to correspond to the actual actions of the competitor.

Figure 14:
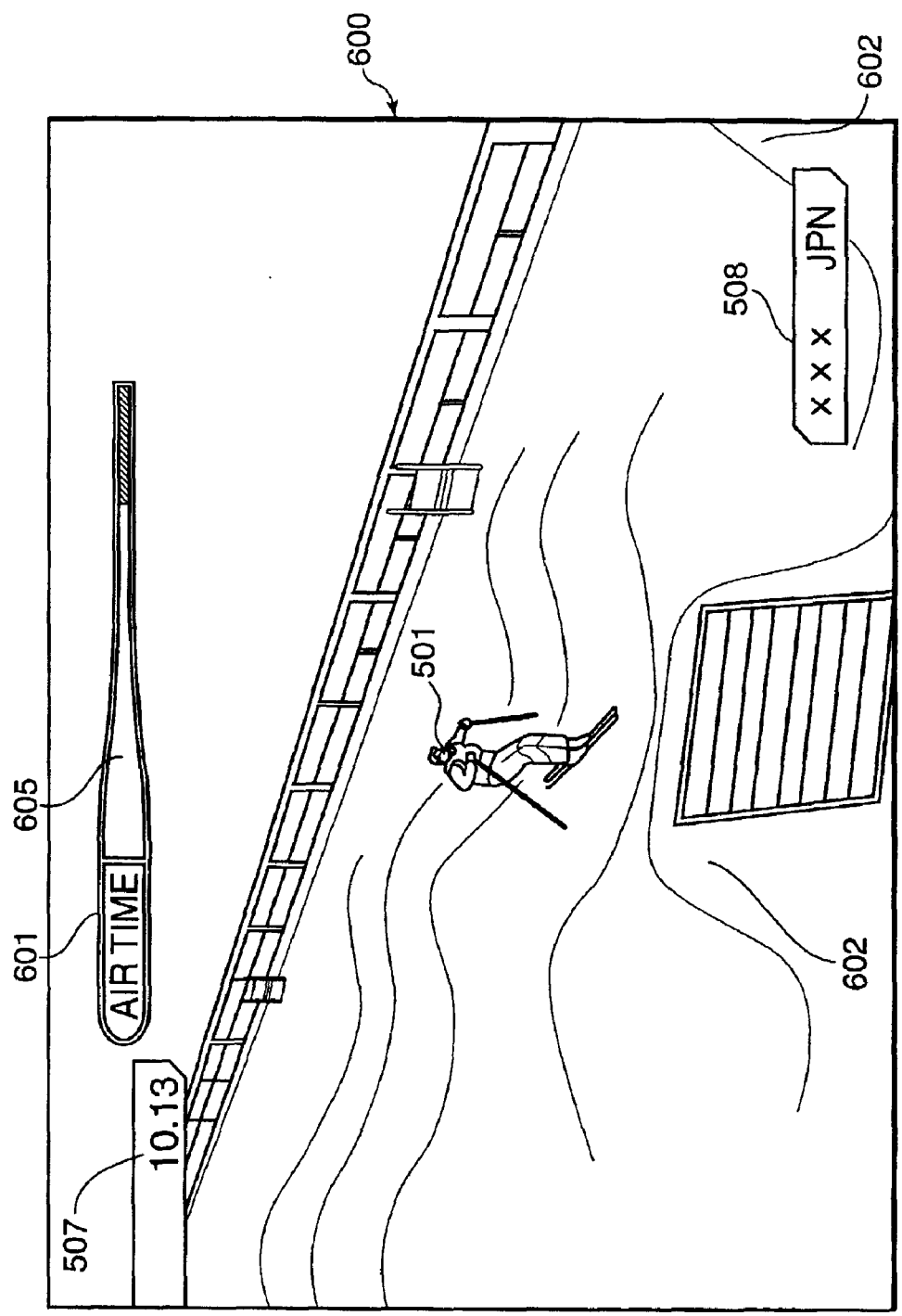
FIG. 14 is a screen diagram showing one example of a game screen displayed within a prescribed length of time.
Figure 15:
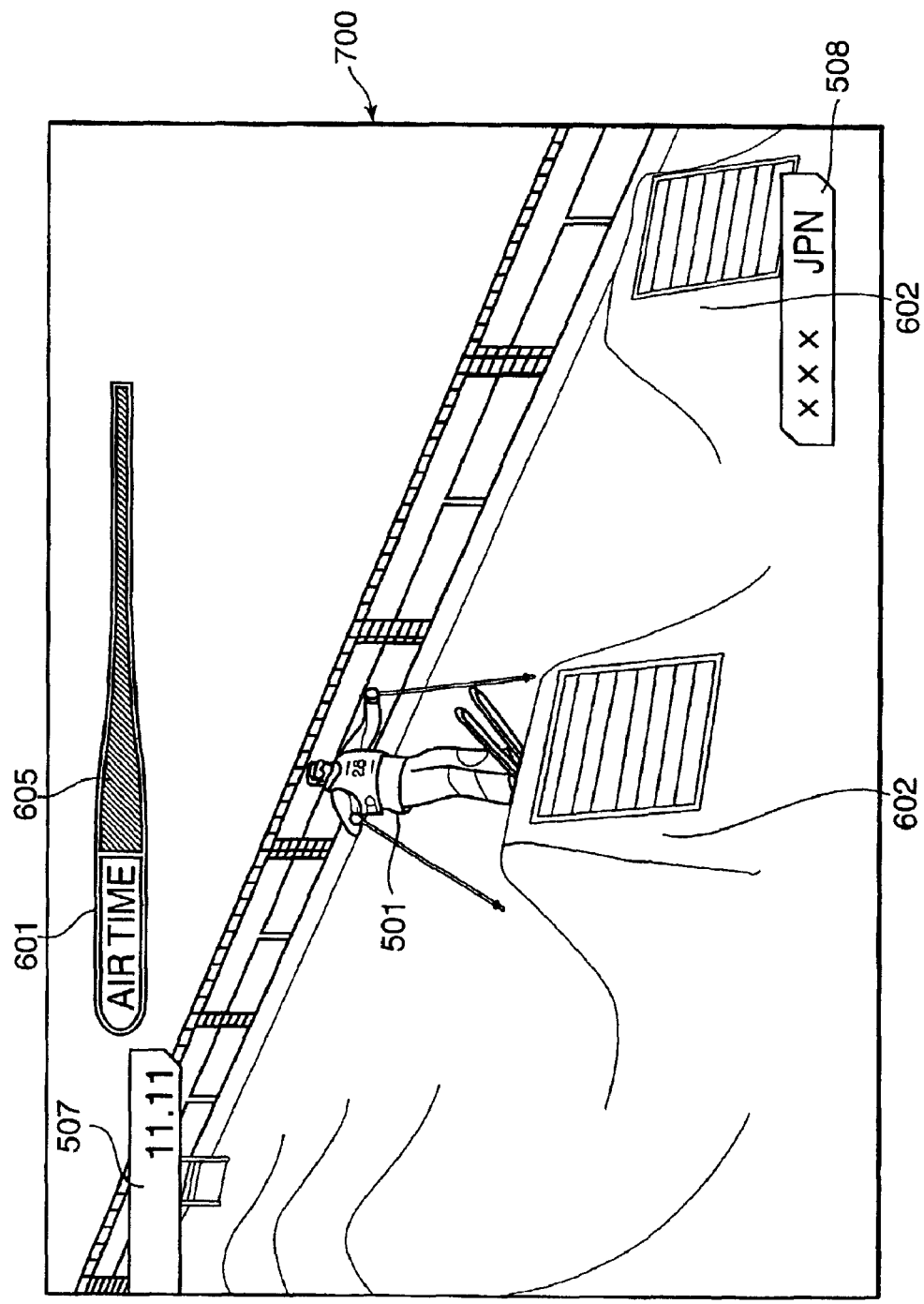
FIG. 15 is a screen diagram showing one example of a game screen displayed at the time when feat input ends.

FIG. 13 is a drawing to explain operations from the controller 19 performed within a prescribed length of time. FIG. 14 and FIG. 15 are screen diagrams showing one example of a game screen displayed within a prescribed length of time.

The arrow 601 shown in FIG. 13 indicates the path of movement of the character; the interval from the time $t_1$ at which the trick input is begun until the time $t_2$ at which trick input is completed is taken to be the trick input-enabled time interval (a prescribed length of time), and the interval from the time $t_2$ of trick input completion until the time $t_3$ of holding completion is taken to be the trick display time interval. The trick input-enabled time interval $t_1$ to $t_2$ is equivalent, in terms of an actual mogul, to the takeoff area (the portion from the last bump before the jump to the tip of the jump platform). The time during which a prescribed operation is performed using the controller 19 is taken to be the trick input time S, and the time for which the final operation of an operation procedure is held is the holding time T. When the trick input beginning time $t_1$ is reached, the image display unit 405 switches from a camera viewpoint which displays the game screen 500 (see FIG. 2), to a camera viewpoint which displays the game screen 600 (see FIG. 14). In this way, by changing the camera viewpoint, the player is notified that the trick input beginning time $t_1$ has been reached.

The character 501, an air time display portion 601, which displays the trick input-enabled time interval $t_1$ to $t_2$, the jump platform 602, the time display portion 507, and character name display portion 508 are displayed on the game screen 600. During the trick input-enabled time interval $t_1$ to $t_2$, operations of the character 501 are not accepted, and only trick input operations are accepted. That is, within the trick input-enabled time interval $t_1$ to $t_2$, the character 501 is, for example, automatically operated by the CPU 1. A gauge 605 is displayed in the air time display portion 601; by progressively shrinking from the right edge to the left edge of the air time display portion 601, this gauge 605 indicates the progression of time in the trick input-enabled time interval $t_1$ to $t_2$. That is, when the gauge 605 reaches the left edge of the air time display portion 601, the trick input-enabled time interval $t_1$ to $t_2$ ends.

On reaching the trick input end time $t_2$, a game screen 700 as shown in FIG. 15 is displayed. The trick input end time $t_2$ represents the instant at which the character 501 leaves the jump platform 602, and the gauge 605 displayed in the air time display portion 601 of the game screen 700 reaches the left edge. The instant at which the character 501 ends the trick and lands on the snow surface of the course is the holding end time $t_3$.

During the trick input-enabled time interval $t_1$ to $t_2$, the operation reception unit 401 receives trick input operations from the controller 19. And, during the trick display interval $t_2$ to $t_3$, the image display unit 405 displays images representing the trick corresponding to the input operation procedure on the game screen.

Figure 16:
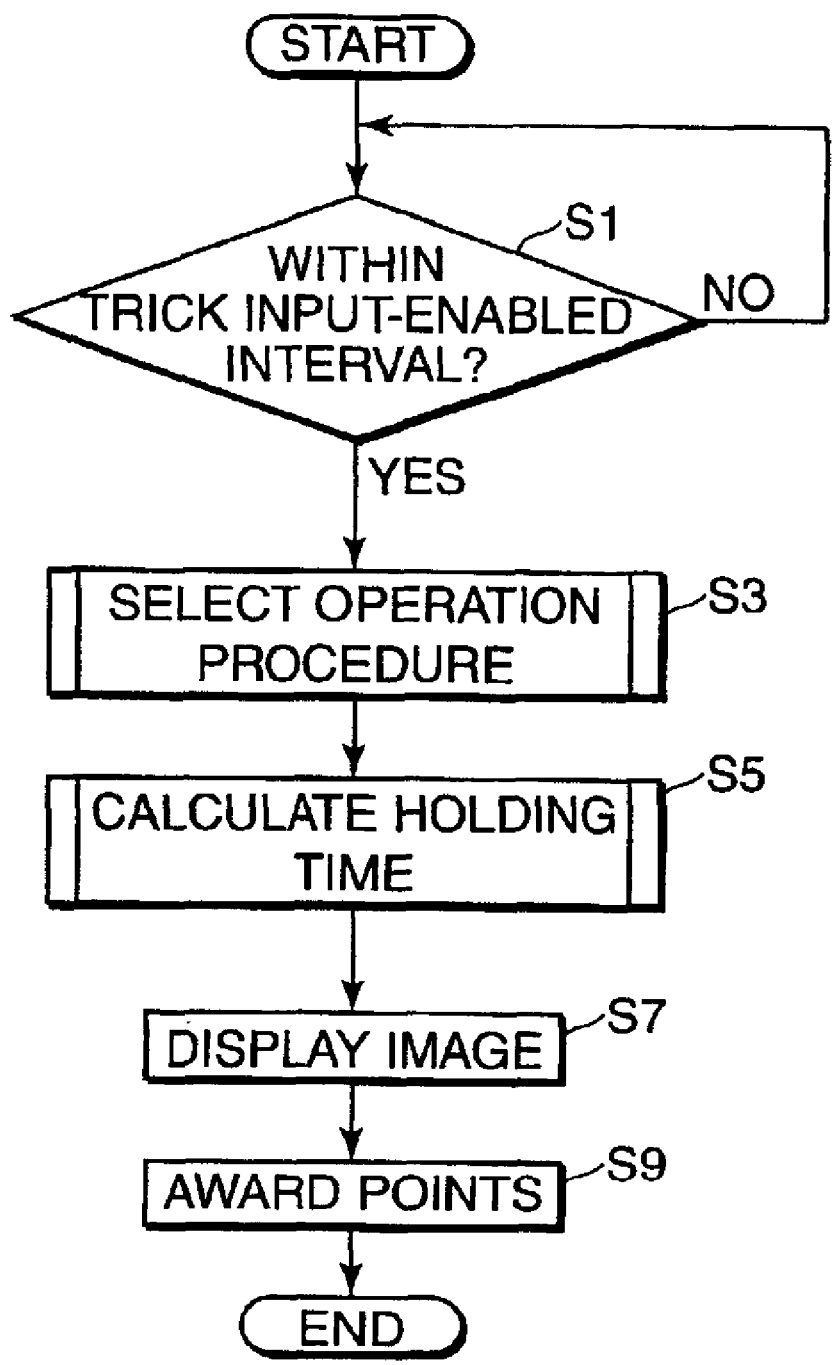
FIG. 16 is an example of a flowchart showing the actions of a video game device of this invention; and, FIG. 17 is an example of a flowchart showing processing actions to select an operation procedure in step S3 of FIG. 16.

FIG. 16 is an example of a flowchart showing the actions of a video game device of this invention.

In step S1, the operation reception unit 401 judges whether an operation from the controller 19 is within the trick input-enabled time interval $t_1$ to $t_2$ (a prescribed length of time). If it is judged that the operation is within the trick input-enabled time interval $t_1$ to $t_2$ ("YES" in step S1), processing proceeds to step S3; if it is judged that the operation is not within the trick input-enabled time interval $t_1$ to $t_2$ ("NO" in step S1), a wait state is entered.

In step S3, the operation decision unit 402 performs processing to select one operation procedure from among the operation procedures stored in the procedure storage unit 51. That is, the operation procedure among the operation procedures of the tricks shown in FIGS. 4 to 11 equivalent to the operations input by the player from the controller 19 is selected. Details of the processing in step S3 are explained below, based on FIG. 17.

In step S5, when the final operation of the operation procedure selected in step S3 was begun within the trick input-enabled time interval $t_1$ to $t_2$, the time calculation unit 404 calculates the holding time T over which the final operation is continuously held. If the final operation was performed to extend beyond the trick input end time $t_2$, this holding time T becomes invalid (see FIG. 13C).

In step S7, the image display unit 405 displays images of the trick corresponding to the operation procedure selected in step S2 on the game screen. That is, images showing actions of the character 501 as in FIG. 12 are displayed.

In this way, images of the trick corresponding to the player operations are displayed on the game screen, so that the game screen can be used to confirm whether an appropriate operation procedure was performed or not, increasing the appeal of the video game. Also, because images depicting the actions of tricks of the character 501 appearing in the video game are displayed on the game screen, the displayed images corresponding to the operation procedure of the player are abundant in change, and again the appeal of the video game is enhanced.

In step S9, the point-awarding unit 406 awards points based on the trick corresponding to the operation procedure selected in step S2 and the holding time T. For example, if the trick input time S is short, the holding time T is long (see FIG. 13A); hence in the case of simple input operations, the points corresponding to the trick will be low, but the points corresponding to the holding time T will be high. On the other hand, if the trick input time S is long, then the holding time T is short (see FIG. 13B), so that in the case of complicated input operations, the points corresponding to the trick will be high, but the points corresponding to the holding time T will be low.

In the video game of this aspect, two "air tricks" are performed, and so the processing of the above steps S1 to S9 is performed twice.

In this way, points are awarded by the point-awarding unit 406 based on the decision result of the operation decision unit 402 and the holding time T. Hence if, for example, the more complicated the operation procedure which is the decision result, the more points are awarded, and the longer the holding time, the more points are awarded, then in addition to the operation technique of performing complicated operations in a short amount of time, the player must also devise a strategy with respect to which operation procedures to perform, so that the player strategy is reflected in the video game, and the appeal of the video game is enhanced. In an actual mogul run, by halting a trick momentarily in midair, the trick becomes more impressive, and higher points are received. Hence the holding of operations of the controller 19 is associated with momentary halting of the trick, to further add to the appeal of the video game.

Figure 17:
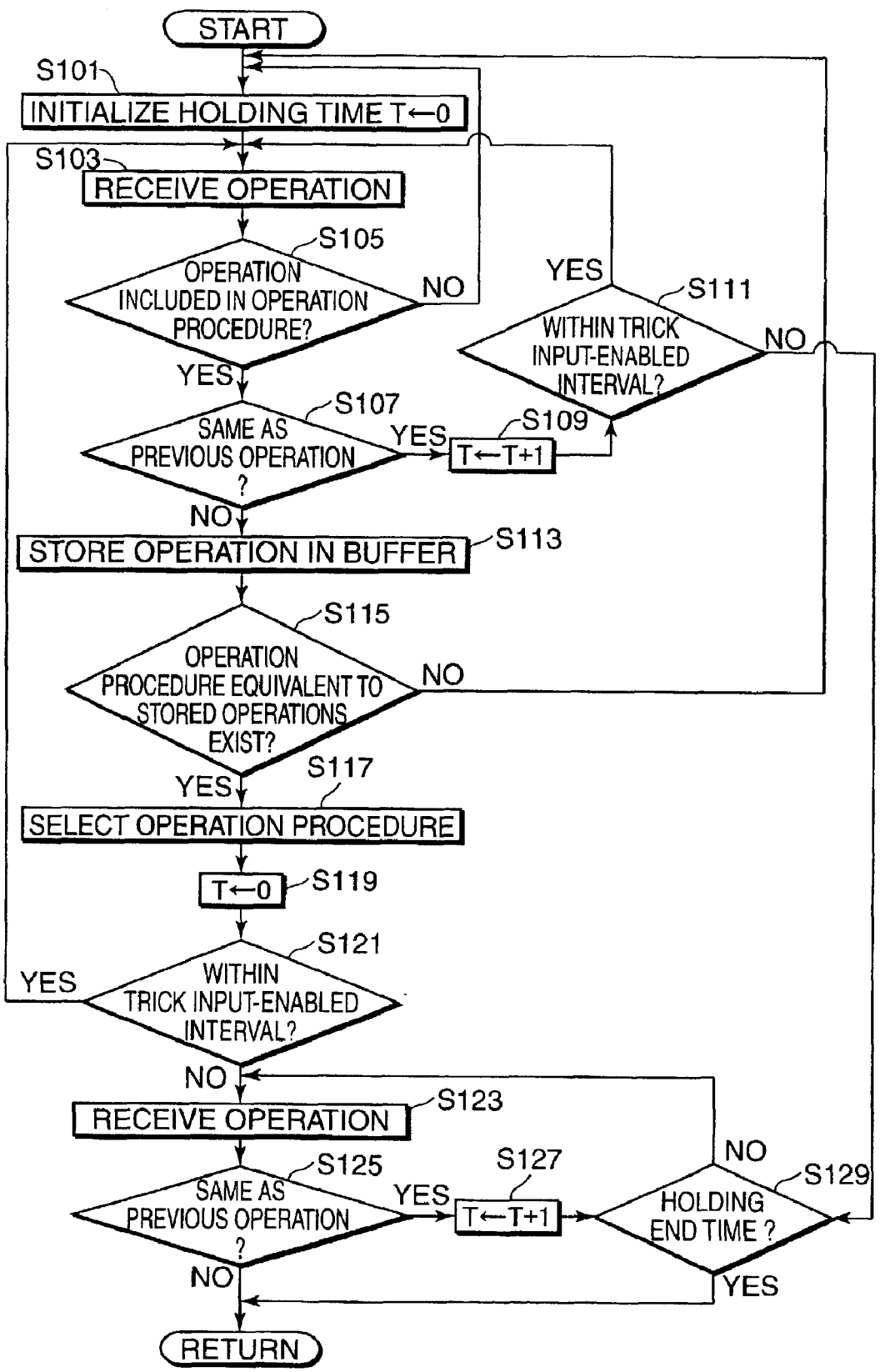

FIG. 17 is an example of a flowchart showing processing actions to select an operation procedure in step S3 of FIG. 16.

In step S101, the holding time T is initialized. That is, the counter for the holding time T is reset to 0. In step S103, the operation reception unit 401 receives operations of the left joystick 19SL and right joystick 19SR of the controller 19 by the player. The operation reception unit 401 detects the directions in which the left joystick 19SL and right joystick 19SR of the controller 19 are tilted, from among eight directions: upward, downward, leftward, rightward, upward-leftward, downward-leftward, upward-rightward, and downward-rightward.

In step S105, the discrimination portion 403 judges whether a received operation is a valid operation included in an operation procedure stored in the procedure storage unit 51. If the operation is judged to be a valid operation included in an operation procedure ("YES" in step S105), processing proceeds to step S107; if the operation is judged to be an invalid operation not included in an operation procedure ("NO" in step S105), processing returns to step S101. For example, when the left joystick 19SL and right joystick 19SR are both tilted to the right, and then the left joystick 19SL and right joystick 19SR are both tilted to the left, the operation procedure corresponding to a double twister, belonging to group 4, is selected (see FIG. 7). On the other hand, if the left joystick 19SL and right joystick 19SR are both tilted to the right, and then the left joystick 19SL and right joystick 19SR are both tilted upward, there are no equivalent operation procedures, and so the latter operation is discriminated as an invalid operation.

Thus by means of the discrimination portion 403 included in the operation decision unit 402, valid operations which are operations included in an operation procedure are discriminated from invalid operations not included in an operation procedure, and operations discriminated as invalid operations are not selected by the operation decision unit 402 as having been performed; hence even when, in the midst of a specific operation procedure, the player erroneously performs an operation not included in the operation procedure, the operation is discriminated as an invalid operation, and the operation procedure equivalent to the remaining operations is selected, so that the erroneous operation of the player can be corrected. For example, when the player is a novice, the accurate performance of operations can be supported.

In step S107, the operation decision unit 402 judges whether an operation is the same as the previous operation. That is, the fact that an operation is the same as the previous operation means that the operation is in the state of being held. Hence if the operation is the same as the previous operation ("YES" in step S107), the holding time T is incremented by 1 (step S109), and processing proceeds to step S111; if the operation is not the same as the previous operation ("NO" in step S107), processing proceeds to step S113. If there is no previous operation, that is, if the received operation is the first operation, the operation is judged not to be the same as the previous operation ("NO" in step S107), and processing proceeds to step S113.

In step S111, the operation decision unit 402 judges whether the current time is within a prescribed time interval (the trick input-enabled time interval, $t_1$ to $t_2$). If judged to be within the trick input-enabled time interval $t_1$ to $t_2$ ("YES" in step S111), processing returns to step S103; if judged not to be within the trick input-enabled time interval $t_1$ to $t_2$ ("NO" in step S111), processing proceeds to step S129.

In step S113, operations input using the controller 19 are stored in a buffer. That is, information on the direction in which the left joystick 19SL is tilted and the direction in which the right joystick 19SR is tilted is stored in the buffer.

In step S115, a judgment is performed as to whether the operation procedure corresponding to the operations stored in the buffer is in the procedure storage unit 51. There are operations, such as rotation operations, which consist of tilting the left joystick 19SL or right joystick 19SR in a plurality of directions; hence a check is performed in order starting with the newest data stored in the buffer. For example, if there is data in the order: downward, downward-rightward, rightward, rightward-upward, upward, then the operation of a half-rotation counterclockwise from downward to upward is adopted. If there is data in the order: downward, downward-rightward, rightward, rightward-upward, upward, upward-leftward, leftward, leftward-downward, downward, then the operation of a full rotation counterclockwise from downward to downward is adopted. If there is data in the order: downward, downward-rightward, rightward, rightward-upward, then a rightward-upward direction operation is adopted. Here, if the operation procedure equivalent to the operations stored in the buffer is judged to be in the procedure storage unit 51 ("YES" in step S115), processing proceeds to step S117, and if the operation procedure equivalent to the operations stored in the buffer is judged not to be in the procedure storage unit 51 ("NO" in step S115), processing returns to step S101.

In step S117, the operation decision unit 402 selects the operation procedure corresponding to the operations input by the player. When the operations stored in the buffer correspond to a plurality of operation procedures, the longest operation procedure is selected.

In step S119, the holding time T is initialized. In step S121, the operation decision unit 402 judges whether the current time is within a prescribed time interval (the trick input-enabled time interval $t_1$ to $t_2$). If judged to be within the trick input-enabled time interval $t_1$ to $t_2$ ("YES" in step S121), processing returns to step S103; if judged not to be in the trick input-enabled time interval $t_1$ to $t_2$ ("NO" in step S121), processing proceeds to step S123.

In step S123, the operation reception unit 401 receives operations by the player of the left joystick 19SL and right joystick 19SR of the controller 19.

In step S125, a judgment is made as to whether an operation is the same as the previous operation. If the operation is judged to be the same as the previous operation ("YES" in step S125), the holding time T is incremented by 1 (step S127), and processing proceeds to step S129; if judged not to be the same as the previous operation ("NO" in step S127), processing ends.

In step S129, a judgment is made as to whether the current time is the holding end time $t_3$. If it is judged that the current time is the holding end time $t_3$ ("YES" in step S129), processing ends; if judged not to be the holding end time $t_3$ ("NO" in step S129), processing returns to step S123. The processing of the above steps S101 to S129 is performed for each frame.

If an input operation is performed after the trick input-enabled time interval $t_1$ to $t_2$, the trick equivalent to the operation procedure input within the trick input-enabled time interval $t_1$ to $t_2$ is selected, and the holding time T is not counted.

When holding is stopped during the interval from the trick input end time $t_2$ to the holding end time $t_3$, it is assumed that the holding time T is not counted.

The present invention can assume the following forms.

(A) In this aspect, a video game simulating a mogul run was explained; the present invention is not limited to such a game, but may be applied to any video game of a form in which operations are input within a prescribed time interval, and points are awarded according to the holding time over which the last operation is held continuously from the prescribed time interval, as for example in the cases of video games which simulate figure skating or snowboarding, for example.

(B) In this aspect, operations are received through operation procedures as shown in FIG. 4 through FIG. 11; but the present invention is not thereby limited, and other operation procedures may be used. For example, the operation of rotating the left joystick 19SL which is the operation for input of the helicopter 360 trick may be performed counterclockwise rather than clockwise as shown in FIG. 8. Also, the rotation operation may be performed with the right joystick 19SR instead of the left joystick 19SL, or may be performed with both the left joystick 19SL and the right joystick 19SR. Further, these operation procedures may be set in advance before the start of the game, or judgments may be performed for all operation procedures.

(C) In this aspect, jump platforms 602 from which tricks are performed are positioned in two places, but the invention is not thereby limited, and platforms may be positioned in three or more places, or in one place. When there are three or more jump platforms 602, points for tricks may for example be awarded for the two jump platforms 602 at which points were highest. In this way, by providing a plurality of prescribed time intervals during which player operations are received, the appeal of the game is further enhanced.

(D) In this aspect, the operation reception unit 401 detects operations in eight directions, but the invention is not thereby limited; fewer than eight directions may be detected, such as for example the four directions upward, downward, leftward, rightward, or more than eight directions, such as for example 16 directions, may be detected. A mode in which four directions are detected is useful in video games where complicated operation input is not required; a mode in which 16 directions are detected is useful in video games requiring complicated operation input.

In summary, the present invention takes a form of a video game device, comprising operating means which is operated by the player, is made to function as: procedure storage means, which stores a plurality of operation procedures of the operating means; operation determination means, which selects, from among the plurality of operation procedures stored in the above procedure storage means, one operation procedure as an operation procedure equivalent to operations from the above operating means performed within a prescribed period of time; time calculation means, which calculates the holding time for holding the last operation performed in an operation procedure selected by the above operation determination means; and, point-awarding means, which awards points based on the decision result of the above operation determination means and the above holding time.

According to the aforementioned invention, a video game device comprising operating means which is operated by the player is made to function as procedure storage means, which stores a plurality of operation procedures of the operating means; operation determination means, which selects one operation procedure from a plurality of operation procedures stored by the procedure storage means; time calculation means, which calculates the holding time for which the last operation performed as an operation procedure selected by the operation determination means is held; and, point-awarding means, which awards points based on the decision result of the operation determination means and the holding time.

That is, a plurality of operation procedures of the operating means are stored by the procedure storage means; the operation determination means selects, as an operation procedure equivalent to operations from the operating means performed within a prescribed period of time, one operation procedure from among a plurality of operation procedures stored by the procedure operating means; and the holding time for which the last operation performed as an operation procedure selected by the operation determination means has been held is calculated. Further, the point-awarding means awards points based on the decision result of the operation determination means and on the holding time.

Hence by means of the point-awarding means, points are awarded based on the decision result of the operation determination means and on the holding time, so that if, for example, the more complicated the operation procedure in a decision result, the higher the points awarded, and the longer the holding time, the higher the points awarded, then in addition to the operation technique of performing complicated operations in a short length of time, the player must also improve strategy with respect to which operation procedures to perform; so that the video game has excellent game properties, in which player strategies are reflected in the game.

The aforementioned invention can be characterized in that the above operating means comprises a plurality of operating portions, and the above operations are operations which use the above plurality of operating portions.

According to the invention with the above feature, the operating means comprises a plurality of operating portions, and operations performed by the player are operations using a plurality of operating portions of the operating means.

That is, the player performs operations using the operating means comprising a plurality of operating portions, so that complicated operations are possible, and the video game has diversified operations and excellent game properties.

In addition, the invention can be characterized in that the above operating means comprises a pair of operating members enabling input of an operation direction, and that the above operations are operations using the above operating members.

According to the invention with the above features, the operating means comprises a pair of operating members enabling input of an operation direction, and operations by the player are operations using the operating members.

That is, operations are performed by the player using an operating means comprising a pair of operating members enabling input of an operation direction, so that complicated operations become possible; for example, actions corresponding to the movements of an athlete in an actual sports game can be performed on a character in the video game.

Moreover, the invention can be characterized in that the above video game device is further made to function as image display means, which displays on the game screen an image corresponding to the decision result of the above operation determination means.

According to the invention with the above features, the video game device is further made to function as image display means which displays an image corresponding to the decision result of the operation determination means on the game screen.

That is, because an image corresponding to the operation of the player is displayed on the game screen, the player can view the game screen to determine whether an appropriate operation procedure was successfully performed or not, so that the appeal of the video game is increased.

Yet, moreover, the invention can be characterized in that the above image display means displays, on the game screen, images representing the actions of a character appearing in the video game.

According to the invention with the aforementioned features, the image display means displays images representing the actions of a character appearing in the video game on the game screen.

That is, images representing the actions of a character appearing in the video game are displayed on the game screen by the image display means, so that displayed images corresponding to the operation procedure of the player are abundant in change, and the appeal of the video game is increased.

In addition, the invention can be characterized in that the above operation determination means comprises discrimination means, which discriminates valid operations which are operations included an operation procedure and invalid operations not included in the operation procedure, and in that the above operation determination means selects one operation procedure from among a plurality of operation procedures stored in the above procedure storage means as a procedure in which an operation, discriminated by the above discrimination means as an invalid operation, is not performed.

According to the invention with the aforementioned features, the operation determination means comprises discrimination means which discriminates valid operations, which are operations included in an operation procedure, from invalid operations not included in the operation procedure, and the operation determination means selects one operation procedure from a plurality of operation procedures stored in the procedure storage means as a procedure in which an operation, discriminated by the discrimination means as an invalid operation, is not performed.

In other words, valid operations which are operations included an operation procedure are discriminated from invalid operations not included in the operation procedure by discrimination means included in the operation determination means, and one operation procedure is selected from among a plurality of operation procedures stored in the procedure storage means as a procedure in which an operation discriminated as an invalid operation is not performed. Hence, for example, when the player is performing a specific operation procedure, even if an erroneous operation not included in the operation procedure is performed, it is discriminated as an invalid operation, and by selecting the operation procedure equivalent to the remaining operations as valid operations, erroneous operations of the player can be corrected. Consequently, when the player is a novice, accurate operations are supported.

Yet furthermore, the invention can also be characterized in that, when the operation from the above operating means is equivalent to a plurality of operation procedures, the above operation determination means selects the longest operation procedure.

According to the invention with the above features, when an operation from the operating means is equivalent to a plurality of operation procedures, the operation determination means selects the longest operation procedure.

In other words, when an operation from the operating means is equivalent to a plurality of operation procedures, the operation determination means selects the longest operation procedure. Hence when, for example, more points are awarded for a longer operation procedure, that is, an operation procedure requiring more complex operation, a longer operation procedure is selected instead of a shorter operation procedure, and so the appeal of the video game is increased.

The present invention can also takes a form of a video game device, comprising operating means operated by a player, is made to: store a plurality of operation procedures of the operating means; execute operation determination processing, in which one operation procedure is determined from among a plurality of stored operation procedures, where an operation procedure is equivalent to (corresponding to) operations from the above operating means performed within a prescribed length of time; execute time calculation processing, to calculate a holding time over which the last operation performed as an operation procedure selected by the above operation decision processing is held; and, point-awarding processing, to award points based on the decision result of the above operation decision processing and the above holding time.

According to the aforementioned form of the invention, a video game device comprising operating means operated by a player is made to store a plurality of operation procedures of the operating means; execute operation decision processing to select one operation procedure from among a plurality of stored operation procedures, where an operation procedure is equivalent to operations from the operating means performed within a prescribed length of time; execute time calculation processing to calculate the holding time over which the last operation performed as an operation procedure selected by the operation decision processing is held; and, execute point-awarding processing to award points based on the decision result of the operation decision processing and the holding time.

In other words, a plurality of operation procedures of the operating means are stored, and by performing operation decision processing, one operation procedure is selected from among a plurality of operation procedures stored as operation procedures equivalent to operations from the operating means performed within a prescribed length of time, and the holding time over which the operation last performed as an operation procedure selected in operation decision processing has been held is calculated in time calculation processing. And in point-awarding processing, points are awarded based on the decision result in operation decision processing and the holding time.

Hence in point-awarding processing, points are awarded based on the decision result of the operation decision processing and on the holding time, so that when for example higher points are awarded when decision results indicate more complicated operation procedures, and higher points are awarded for longer holding times, in addition to the operation technique of performing complicated operations in a short length of time, the player must also improve strategy with respect to which operation procedures to perform; consequently the video game has excellent game properties, and player strategies are reflected in the game.

In addition, the invention takes a form of a video game device comprising operating means operated by a player; procedure storage means, which stores a plurality of operation procedures of the operating means; operation determination means for determining one operation procedure from among a plurality of operation procedures stored in the above procedure storage means as an operation procedure equivalent to (corresponding to) operations from the above operating means performed within a prescribed length of time; time calculation means for calculating the holding time over which the last operation performed as an operation procedure selected by the above operation determination means has been held; and, point-awarding means for awarding points based on the decision result of the above operation determination means and the above holding time.

According to the invention in the above described form, a video game device comprising operating means operated by a player further comprises procedure storage means, which stores a plurality of operation procedures of the operating means; operation determination means, which selects one operation procedure from among a plurality of operation procedures stored in the procedure storage means, as an operation procedure equivalent (corresponding) to operations from the above operating means performed within a prescribed length of time; time calculation means, which calculates the holding time over which the last operation performed as an operation procedure selected by the operation determination means has been held; and, point-awarding means, which awards points based on the decision result of the operation determination means and the holding time.

That is, a plurality of operation procedures of the operating means are stored in the procedure storage means; one operation procedure is selected from among a plurality of operation procedures stored in the procedure storage means as an operation procedure corresponding to operations from the operating means performed in a prescribed length of time; and, the holding time, over which the last operation performed as an operation procedure selected by the operation determination means had been held, is calculated by the time calculation means. And, points are awarded by the point-awarding means based on the decision result of the operation determination means and the holding time.

Hence points are awarded by the point-awarding means based on the decision result of the operation determination means and the holding time, so that when for example higher points are awarded when decision results indicate more complicated operation procedures, and higher points are awarded for longer holding times, in addition to the operation technique of performing complicated operations in a short length of time, the player must also improve strategy with respect to which operation procedures to perform; consequently the video game has excellent game properties, and player strategies are reflected in the game.

This application is based on Japanese patent application serial no. 2001-313878, filed in Japan Patent Office on Oct. 11, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A recording medium storing a game progress control program, said game progress control program causes a video game device, comprising operating means operated by a player to input operations, to function as:

procedure storage means for storing a plurality of operation procedures of the operating means;

operation determination means for determining from among a plurality of operation procedures stored in said procedure storage means one operation procedure corresponding to the operations from said operating means performed within a prescribed time period;

time calculation means for calculating a holding time over which a last operation performed in the operation procedure selected by said operation determination means is held and within the prescribed time period; and, point-awarding means for awarding points based on a determination result of said operation determination means identifying the operation procedure selected and on said holding time wherein points awarded are increased with increased length of holding time.

2. The recording medium according to claim 1, wherein said operating means includes a plurality of operating portions, and said operations are operations using said plurality of operating portions.

3. The recording medium according to claim 2, wherein said operating means includes a pair of operating members enabling input of an operation direction, and said operations are operations using said operating members.

4. The recording medium according to claim 1, wherein said video game device is further made to function as image display means, which displays on a game screen images of maneuver of the one operation corresponding to the determination result of said operation determination means after a completion of input of the operations by the player.

5. The recording medium according to claim 4, wherein said image display means displays, on the game screen, images representing the actions of a character appearing in the video game.

6. The recording medium according to claim 1, wherein said operation determination means includes a discrimination means, which discriminates valid operations which are operations included in an operation procedure and invalid operations not included in an operation procedure, and said operation determination means selects the one operation procedure from among the plurality of operation procedures stored in the procedure storage means, as a procedure in which an operation discriminated by the above discrimination means as an invalid operation is not performed.

7. The recording medium according to claim 6, wherein:

when the operations from said operating means are equivalent to a plurality of operation procedures of said stored operation procedures, said operation determination means selects a longest operation procedure from among said plurality of operation procedures to which said operations are equivalents as the one operation procedure; and said video game device is further made to function as image display means, which displays on a game screen images of maneuvers of the one operation procedure corresponding to the determination result of said operation determination means after a completion of input of the operations by the player.

8. The recording medium according to claim 1, wherein said point-awarding means awards an increasing amount of points in accordance with an increasing complexity level of the operation procedure selected.

9. A game progress control method, which causes a video game device including operating means operated by a player to input operations, to perform the following steps:

storing a plurality of operation procedures of the operating means;

determining one operation procedure among the plurality of stored operation procedures corresponding to the operations from said operating means performed within a prescribed time period;

calculating a holding time over which a last operation performed in said operation procedure determined in the above step is held and within the prescribed time period; and, awarding points based on a determination result of said determining step identifying the operation procedure selected and said holding time wherein point awarded are increased length of said holding time.

10. The method according to claim 9, wherein said point-awarding step awards an increasing amount of points in accordance with an increasing complexity level of the operation procedure selected.

11. A video game device comprising:

operating means operated by a player to input operations;

procedure storage means for storing a plurality of operation procedures of the operating means;

operation determination means for determining one operation procedure from among the plurality of operation procedures stored in said procedure storage means corresponding to the operations from said operating means performed within a prescribed time period;

time calculation means for calculating a holding time over which a last operation performed in the one operation procedure selected by said operation determination means has been held and within the prescribed time period; and, point-awarding means for awarding points based on a determination result of said operation determination means identifying the operation procedure selected and said holding time wherein points awarded are increased with increased length of said holding time.

12. The game device according to claim 11, wherein said point-awarding means awards an increasing amount of points in accordance with an increasing complexity level of the operation procedure selected.

13. A game progress control program causes a video game device, comprising operating means operated by a player to input operations, to function as:

procedure storage means for storing a plurality of operation procedures of the operating means;

operation determination means for determining from among a plurality of operation procedures stored in said procedure storage means, one operation procedure corresponding to operations from said operating means performed within a prescribed time period;

time calculation means for calculating a holding time over which a last operation performed in the operation procedure selected by said operation determination means is held and within the prescribed time period; and, point-awarding means for awarding points based on a determination result of said operation determination means identifying the operation procedure selected and on said holding time wherein points awarded are increased with increased length of said holding time.

* * * * *